US008614991B2

(12) United States Patent
Nagasawa et al.

(10) Patent No.: US 8,614,991 B2
(45) Date of Patent: Dec. 24, 2013

(54) WIRELESS COMMUNICATION APPARATUS AND COMMUNICATION APPARATUS

(75) Inventors: Chizuko Nagasawa, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 405 days.

(21) Appl. No.: 12/989,042

(22) PCT Filed: Apr. 24, 2009

(86) PCT No.: PCT/JP2009/058198
§ 371 (c)(1),
(2), (4) Date: Oct. 21, 2010

(87) PCT Pub. No.: WO2009/131222
PCT Pub. Date: Oct. 29, 2009

(65) Prior Publication Data
US 2011/0044293 A1 Feb. 24, 2011

(30) Foreign Application Priority Data

Apr. 25, 2008 (JP) .................... 2008-115882
Apr. 25, 2008 (JP) .................... 2008-115903

(51) Int. Cl.
*H04W 4/00* (2009.01)
(52) U.S. Cl.
USPC ............ 370/332; 370/335; 370/336; 370/338
(58) Field of Classification Search
USPC ............... 370/331, 332, 412, 335, 336, 338; 455/436, 439; 709/226
See application file for complete search history.

(56) References Cited

U.S. PATENT DOCUMENTS

| 7,440,430 | B1 * | 10/2008 | Jagadeesan et al. | 370/331 |
| 2002/0183062 | A1 * | 12/2002 | Kubosawa | 455/436 |
| 2005/0049000 | A1 | 3/2005 | Sheynman et al. | |
| 2006/0077994 | A1 * | 4/2006 | Spindola et al. | 370/412 |
| 2006/0195576 | A1 * | 8/2006 | Rinne et al. | 709/226 |
| 2007/0249355 | A1 * | 10/2007 | Kang et al. | 455/439 |
| 2008/0132236 | A1 * | 6/2008 | Kiribayashi | 455/436 |

FOREIGN PATENT DOCUMENTS

| EP | 1858270 | 11/2007 |
| JP | 2000-308128 | 11/2000 |
| JP | 2007503761 | 2/2007 |

(Continued)

OTHER PUBLICATIONS

C. Perkins, "IP Mobility Support (RFC2002)", [online], Oct. 1996, IETF, [searched on Mar. 15, 2006], internet <URL: http://www.ietf.org/rfc/rfc2002.txt.

*Primary Examiner* — Brian D Nguyen
*Assistant Examiner* — Toan Nguyen
(74) *Attorney, Agent, or Firm* — Workman Nydegger

(57) ABSTRACT

There is a problem that, if a silent period is generated to a real-time application such as VoIP due to handover using BBM method, a user has a sense of anxiety and misunderstands that communication is completely disconnected. If the silent period is generated to the real-time application such as VoIP due to packet loss at handover, a terminal activates handover alarm (beep sound, for example), indicating that handover is in progress, during the silent period. Thereby, it notifies the user that the silent period is caused by handover and prevents user's misunderstanding that communication is completely disconnected.

11 Claims, 22 Drawing Sheets

(56) References Cited

FOREIGN PATENT DOCUMENTS

| | | |
|---|---|---|
| JP | 2008-005392 | 1/2008 |
| JP | 2008-022308 | 1/2008 |
| JP | 509247/2010 | 6/2011 |
| JP | 2010-509247 | 2/2012 |
| KR | 100803862 | 2/2008 |
| KR | 10-2010-7023698 | 9/2011 |
| WO | 2006/095652 A1 | 9/2006 |

* cited by examiner (a)

(b)

WIRELESS COMMUNICATION APPARATUS AND COMMUNICATION APPARATUS

CROSS REFERENCE TO RELATED APPLICATIONS

This application claims priority to and the benefit of Japanese Patent Application No. 2008-115882 (filed on Apr. 25, 2008) and Japanese Patent Application No. 2008-115903 (filed on Apr. 25, 2008), the entire contents of which are incorporated herein by reference.

TECHNICAL FIELD

The present invention relates to a wireless communication apparatus capable of performing handover between different wireless communication networks and a communication apparatus for communicating with the wireless communication apparatus.

BACKGROUND ART

In recent years, IETF (Internet Engineering Task Force) has been considering an IP mobility scheme for seamless movement, which enables handover between a plurality of different wireless communication networks, such as a mobile phone network, a wireless LAN and the likes, in order to achieve ubiquitous environment. As a specific protocol of the IP mobility scheme, there are Mobile IPv4 and Mobile IPv6 (which are correctively referred to as Mobile IP, hereinafter. See Non-Patent Document 1) for supporting movement of individual communication terminal, and NEMO (Network Mobility) for supporting mobility of a network as a unit.

In Mobile IP and NEMO, when a mobile node (hereinafter, abbreviated as MN) performs handover from a wireless communication network (hereinafter, referred to as "first wireless NW") of a handover source to another wireless communication network (a wireless communication network of a handover destination), the MN registers an IP address of the wireless communication network of the handover destination (hereinafter, referred to as "second wireless NW") as a care-of address (hereinafter, referred to as "CoA") with a home agent (hereinafter, referred to as "HA") to which the MN belongs. Thereby, the MN can communicate with a correspondent node (hereinafter, referred to as "CN") as a communication counterpart via the second wireless NW.

As handover methods, there are known MBB (Make-Before-Break) method to connect to the second wireless NW before disconnecting the first wireless NW and BBM (Break-Before-Make) method to connect to the second wireless NW after disconnecting the first wireless NW. The BBM method has an advantage to be able to perform handover in relatively simple processing, as having no necessity to administrate simultaneous connection to a plurality of wireless communication networks.

Non-Patent Document 1: C. Perkins, "IP Mobility Support (RFC2002)", [online], October 1996, IETF, [searched on Mar. 15, 2006], internet <URL: http://www.ietf.org/rfc/rfc2002.txt

SUMMARY OF INVENTION

Technical Problem

However, by the BBM method, since the MN first disconnects wireless connection to the first wireless NW, it temporarily suspends communication between the MN and the CN. After this, for normal Mobile IP, the MN can resume communication with the CN by connecting to the second wireless NW and registering CoA of the second wireless NW with the HA. However, during a period after the MN disconnects wireless connection to the first wireless NW and before the MN registers CoA of the second wireless NW with the HA, the MN and the CN cannot communicate with each other, which generates packet loss.

As a result, if the MN performs handover using the BBM method during communication by using a real-time application such as VoIP, voice is cut off due to packet loss and thereby a silent period is generated, which leads to deterioration of communication quality and real-time property.

Even if the silent period is generated to the real-time application such as VoIP due to handover using the BBM method as stated above, the MN and the CN can resume communication with the real-time application when handover processing is completed. However, it is impossible for both users of the MN and the CN to determine whether silence in the real-time application is caused due to handover or complete disconnection of communication because of a poor radio condition. In other words, when silence occurs during execution of the real-time application, the user cannot determine whether the communication will be resumed after a predetermined period or the user needs to resume the communication voluntarily.

In particular, since it may take a few seconds to over a dozen seconds to connect to the second wireless NW after disconnection of the first wireless NW, there has been a problem that, even if silence is caused by handover, the user has a sense of anxiety and misunderstands that communication is completely disconnected.

In order to prevent generation of silent period due to handover, process to change a reproduction speed of packets already received is performed when packets cannot be received due to handover, for example. However, it does not provide a fundamental solution to the silent period, and there is no suggested technique which solves user's sense of anxiety and misunderstanding to the silent period.

In consideration of such problem, it is an object of the present invention to provide a wireless communication apparatus and a communication apparatus which enable the user to determine that the silent period is caused by handover when the silent period is caused to the real-time application such as VoIP due to handover using the BBM method, without misunderstanding that the silent period is caused due to disconnection of communication.

Solution to Problem

In order to achieve the above object, a wireless communication apparatus according to a first aspect of the present invention includes:

a wireless communication unit for performing wireless communication by connecting to a first wireless communication network and a second wireless communication network different from the first wireless communication network;

an execution unit for executing an application for real-time communication via the wireless communication unit;

a communication quality obtaining unit for obtaining communication quality of a wireless link of the first wireless communication network during execution of the application by connecting to the first wireless communication network;

a determination unit for determining whether to start preparing handover from the first wireless communication network to the second wireless communication network based on the communication quality obtained by the communication quality obtaining unit;

an estimation unit, when the determination unit determines to start preparing handover during execution of the application, for estimating a handover start time based on the communication quality obtained by the communication quality obtaining unit; and a control unit for controlling so as to notify that handover is in progress, during processing of the handover.

A second aspect of the present invention is that, in the wireless communication apparatus according to the first aspect, the control unit controls the execution unit to slow down a reproduction speed of the application from a predetermined time before the handover start time estimated by the estimation unit.

A third aspect of the present invention is the wireless communication apparatus according to the first or the second aspect, further including a determination unit for determining whether a user is a speaker or a hearer in the application, wherein the control unit controls a time to notify that the handover is in progress, based on a result of determination by the determination unit.

A fourth aspect of the present invention is that, in the wireless communication apparatus according to the third aspect, the control unit, based on the result of determination by the determination unit, notifies that the handover is in progress immediately after start of handover, if the user is a speaker, and notifies that the handover is in progress when there is no reproduction data of the application after start of handover, if the user is a hearer.

A fifth aspect of the present invention is that, in the wireless communication apparatus according to one of the first to fourth aspects, the estimation unit estimates a handover completion time, and the control unit controls a notification interval to notify that the handover is in progress, based on the handover completion time estimated by the estimation unit.

A sixth aspect of the present invention is that, in the wireless communication apparatus according to the fifth aspect, the control unit controls the notification interval to notify that the handover is in progress so as to become shorter as it is closer to the handover completion time.

In order to achieve the above object, a communication apparatus according to a seventh aspect of the present invention includes:

a communication unit for executing communication by connecting to a communication network;

an execution unit for executing an application for real-time communication via the communication unit; and a control unit for controlling so as to receive handover information, from a wireless communication apparatus, that the wireless communication apparatus, which is a communication counterpart of the application, performs handover from a first wireless communication network being communicated to a second wireless communication network different from the first wireless communication network and to notify that the handover is in progress during processing of the handover.

An eighth aspect of the present invention is that, in the communication apparatus according to the seventh aspect, the control unit, based on the handover information, controls the execution unit to slow down a reproduction speed of the application from a predetermined time before a time when packets from the first wireless communication network cannot be received.

A ninth aspect of the present invention is the communication apparatus according to the seventh or eighth aspect, further including a determination unit for determining whether a user is a speaker or a hearer in the application, wherein the control unit controls a time to notify that the handover is in progress, based on a result of determination by the determination unit.

A tenth aspect of the present invention is that, in the communication apparatus according to the ninth aspect, the control unit, based on the result of determination by the determination unit, notifies that the handover is in progress when packets cannot be transmitted via the first wireless communication network, if the user is a speaker, and notifies that the handover is in progress when there is no reproduction data of the application after reception of the handover information, if the user is a hearer.

Advantageous Effects on Invention

According to the present invention, if a silent period is generated to a real-time application such as VoIP due to packet loss at handover, a terminal generates handover alarm (hereinafter, referred to as "HO alarm", which is a beep sound, for example) indicating that handover is in progress, during the silent period. Accordingly, the present invention can notify the user that the silent period is generated due to handover and prevent user's misunderstanding that communication is completely disconnected.

DESCRIPTION OF EMBODIMENT

Embodiments of the present invention will be described with reference to the accompanying drawings.

Figure 1:
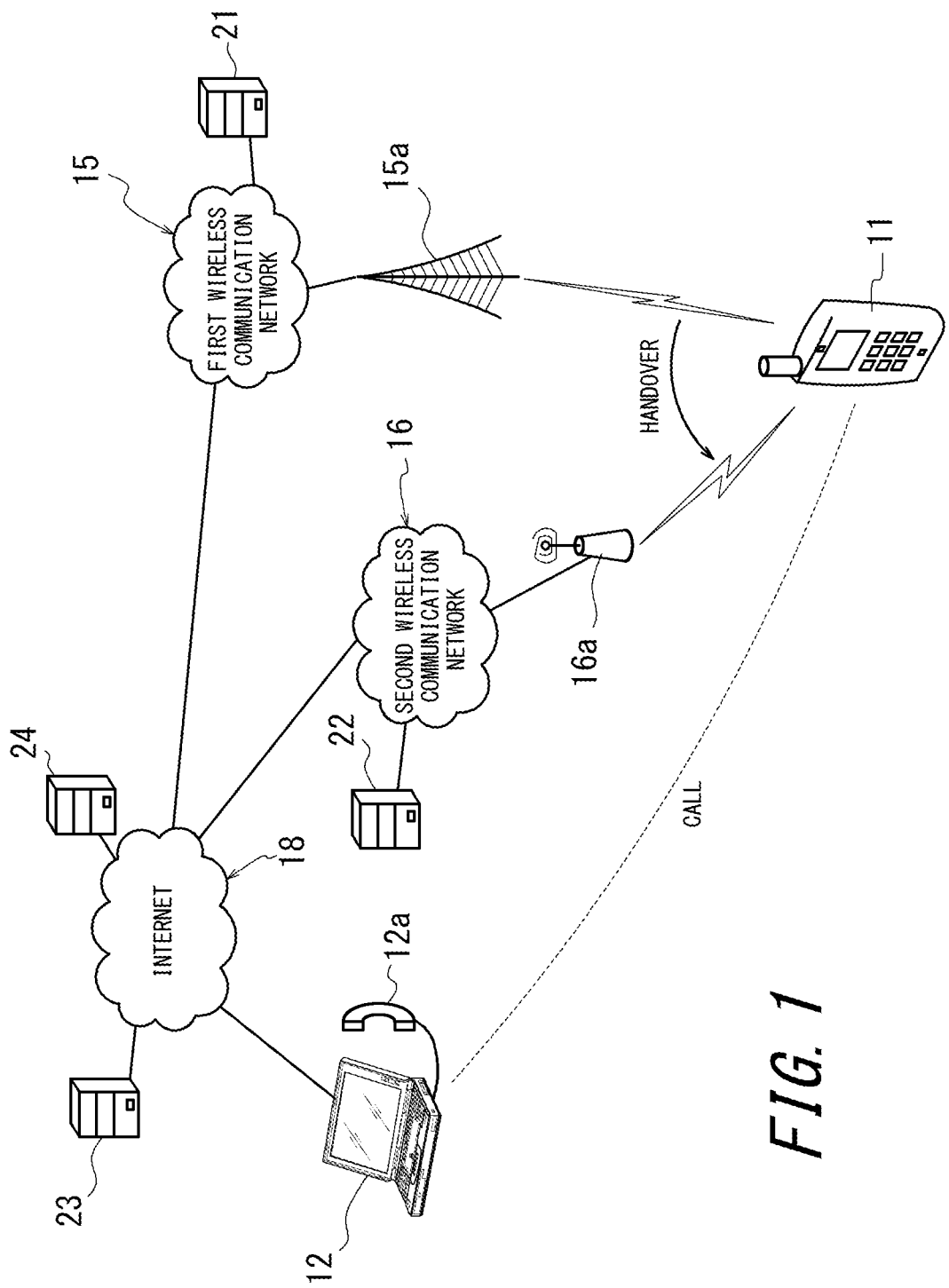
FIG. 1 is a diagram illustrating a schematic constitution of a communication network which a wireless communication apparatus according to an embodiment of the present invention can use.

FIG. 1 is a diagram illustrating a schematic constitution of a communication network which a wireless communication apparatus according to the embodiment of the present invention can use. FIG. 1 shows a case where a wireless communication apparatus 11 (hereinafter, referred to as "MN 11"), which is a mobile node, calls a counterpart communication terminal 12 (hereinafter, referred to as "CN 12"), which is a correspondent node, by use of VoIP, an application for real-time communication. The MN 11 can perform handover between a first wireless communication network 15 (hereinafter, referred to as "first wireless NW 15") and a second wireless communication network 16 (hereinafter, referred to as "second wireless NW 16"). The first wireless NW 15 and the second wireless NW 16 are connected to the internet 18.

Here, the first wireless NW 15 is a mobile phone network of CDMA2000 1x EV-DO (Code Division Multiple Access 2000 1x Evolution Data Only) and the second wireless NW 16 is a wireless LAN (Local Area Network), for example. In FIG. 1, a reference sign 15a indicates a base station of the first wireless NW 15, whereas a reference sign 16a indicates an access point of the second wireless NW 16.

The CN 12 may be a personal computer, for example, having a handset 12a connected thereto and a softphone installed therein, and is connected to the internet 18 via an internet service provider (not shown).

The first wireless NW 15 and the second wireless NW 16 are connected to SIP (Session Initiation Protocol) servers 21 and 22 for controlling communication, respectively. In addition, a Home Agent (hereinafter, referred to as "HA 23") 23 for transferring received packets addressed to the MN 11 to a wireless communication network to which the MN 11 is connected and a SIP server 24 for controlling communication are connected to the internet 18.

In the communication network shown in FIG. 1, the MN 11 registers a home address of the first wireless NW 15 with the HA 23 and, at handover, also registers a care-of address (CoA) of the second wireless NW 16. Thereby, the MN 11 can perform handover between different wireless communication networks. Since such IP mobility techniques are known in the above Mobile IP and NEMO, detailed description thereof is omitted here.

According to the present embodiment, a wireless communication network to which the MN 11 originally belongs is the first wireless NW 15. The MN 11 performs handover from the first wireless NW 15 to the second wireless NW 16. Absolute delay times of packets transmitted and received between the MN 11 and the CN 12 (or HA 23) in the first wireless NW 15 is different from those in the second wireless NW 16.

(Constitution of the MN 11)

Figure 2:
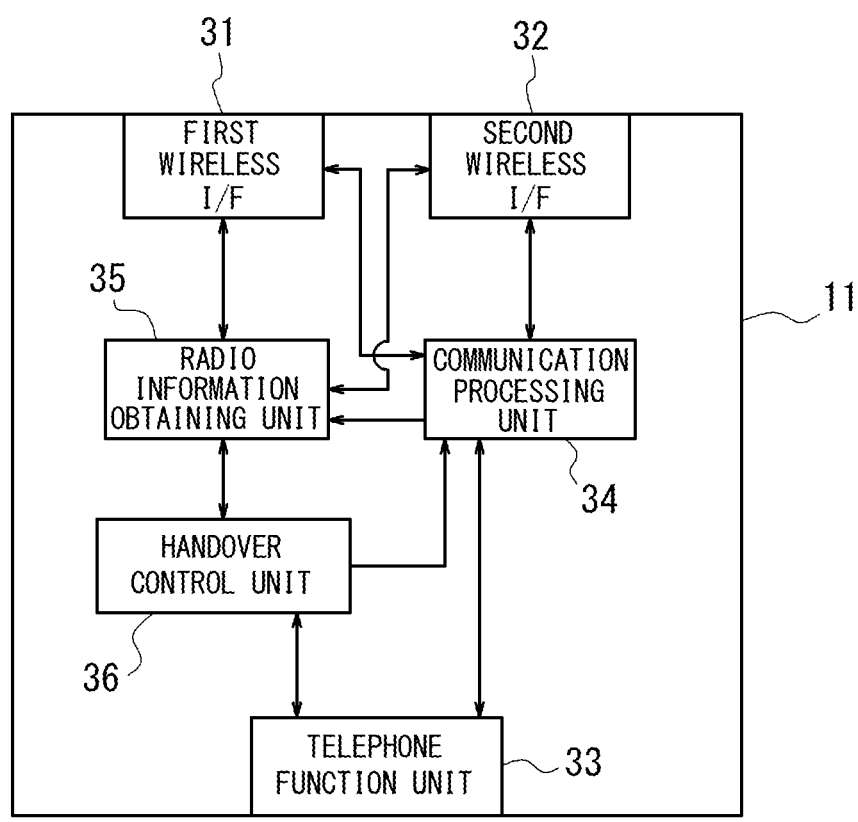
FIG. 2 is a block diagram illustrating a schematic constitution of the wireless communication apparatus shown in FIG. 1.

FIG. 2 is a functional block diagram illustrating a schematic constitution of the MN 11 according to the present embodiment shown in FIG. 1. The MN 11 has a first wireless I/F (interface) 31 corresponding to the first wireless NW 15, a second wireless I/F 32 corresponding to the second wireless NW 16, a telephone function unit 33 for executing a VoIP application, a communication processing unit 34 for controlling connection to the first wireless NW 15 and the second wireless NW 16, a radio information obtaining unit 35 for obtaining radio information of the first wireless NW 15 and the second wireless NW 16, and a handover control unit 36 for controlling handover between the first wireless NW 15 and the second wireless NW 16.

The communication processing unit 34 constitutes a wireless communication unit for performing wireless communication. The communication processing unit 34 performs communication between the telephone function 33 and the CN 12 via the first wireless NW 15 or the second wireless NW 16. In addition, the communication processing unit 34 controls connection of the first wireless I/F 31 or the second wireless I/F 32 so as to communicate with the HA 23 under control of the handover control unit 36.

The radio information obtaining unit 35 constitutes a communication quality obtaining unit for obtaining communication quality of a wireless link. The radio information obtaining unit 35 obtains communication quality of the first wireless NW 15 and the second wireless NW 16 from the first wireless I/F 31 and the second wireless I/F 32 as radio information, correspondingly, and provides the communication quality to the handover control unit 36. Here, for example, RSSI (Received Signal Strength Indicator) indicating radio state is obtained as the communication quality. Accordingly, the radio information obtaining unit 35 constitutes a communication quality obtaining unit for obtaining communication quality of a wireless link, according to the present embodiment.

The handover control unit 36 constitutes a determination unit for determining whether to start preparation for handover and an estimation unit for estimating a time to start handover. The handover control unit 36 generates handover information including a determination whether to schedule handover, that is, whether to start preparation for handover, based on the communication quality from the radio information obtaining unit 35, and controls handover based on the handover information. In addition, the handover control unit 36 obtains handover start and completion times (hereinafter, referred to as "HO start and completion times") and also a variety of network delay times (hereinafter, referred to as "NW delay times") through the communication processing unit 34.

(Constitution of the CN 12)

Figure 3:
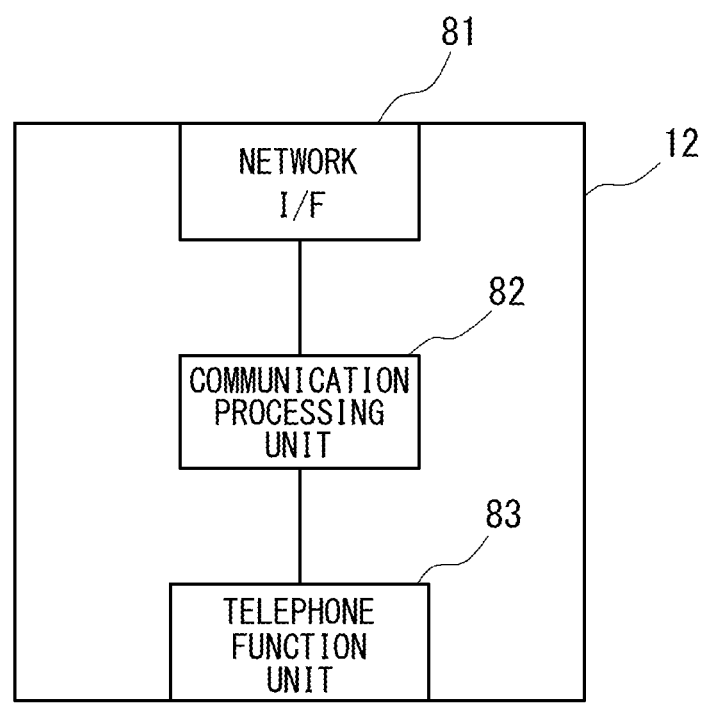
FIG. 3 is a block diagram illustrating a schematic constitution of a communication apparatus shown in FIG. 1.

FIG. 3 is a functional block diagram illustrating a schematic constitution of the CN 12 according to the present embodiment shown in FIG. 1. The CN 12 has a network OF 81 for connecting to the internet, a telephone function unit 83 for executing the VoIP application, and a communication processing unit 82 for controlling connection to the internet.

The communication processing unit 82 constitutes a communication unit for executing communication. The communication processing unit 82 controls the network OF 81 such that communication between the telephone function unit 83 and the MN 11 is performed via the internet.

(Description of Packet Loss Due to Handover Using the BBM Method)

Figure 4:
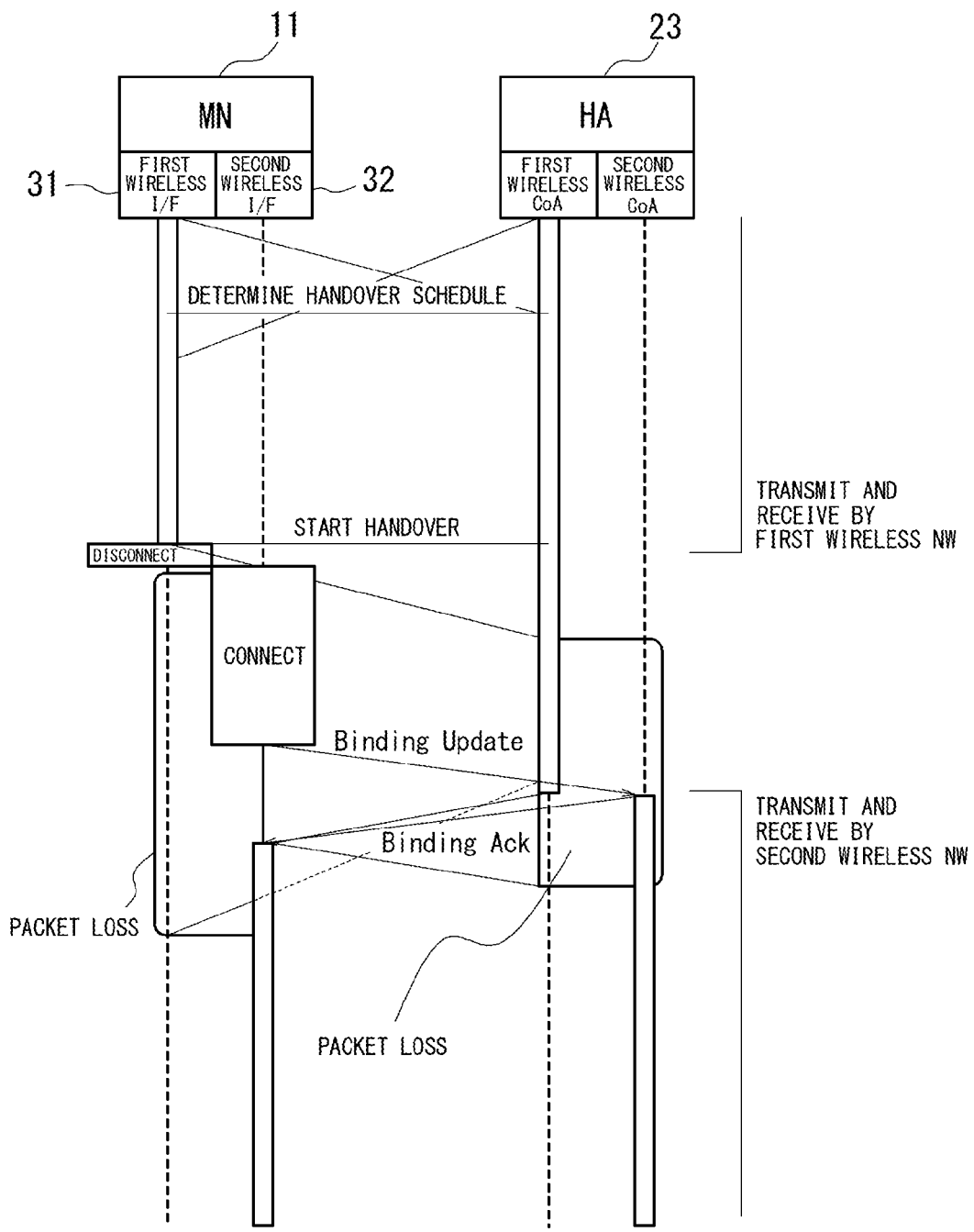
FIG. 4 is a diagram illustrating packet loss caused by conventional handover.

FIG. 4 is a diagram illustrating a communication sequence between the MN 11 and the HA 23 at handover. As shown in FIG. 4, after determining a handover schedule, the handover control unit 36 disconnects the first wireless I/F 31 from the first wireless communication NW 15 and then connects the second wireless OF 32 to the second wireless NW 16. Next, the handover control unit 36 controls the communication processing unit 34 to transmit Binding Update to the HA 23 via the second wireless NW 16 to register CoA of the second wireless NW 16 with the HA 23.

When receiving Binding Update from the MN 11 and registering CoA of the second wireless NW 16, the HA 23 transmits Binding Ack to the MN 11. When the MN 11 receives Binding Ack transmitted from the HA 23, the handover control unit 36 of the MN 11 controls the communication processing unit 34 to communicate by using the second wireless NW 16.

As shown in FIG. 4, in the sequence of handover stated above, the MN 11 cannot receive packets transmitted from the HA 23 via the first wireless NW 15 after disconnecting the first wireless I/F 31 from the first wireless NW 15 and before Binding Update transmitted from the MN 11 reaches the HA 23. Thus, packet loss occurs at the MN 11. In addition, the MN 11 cannot transmit packets to the HA 23 after disconnecting the first wireless I/F 31 from the first wireless NW 15 and before receiving Binding Act from the HA 23. As a result, a silent period is generated at the CN 12 similarly to packet loss. For example, if handover is performed during communication by using a real-time application such as VoIP, a silent period is generated due to packet loss, which causes user's sense of anxiety and misunderstanding.

(Constitution of the Telephone Function Unit 33 of the MN 11)

Figure 5:
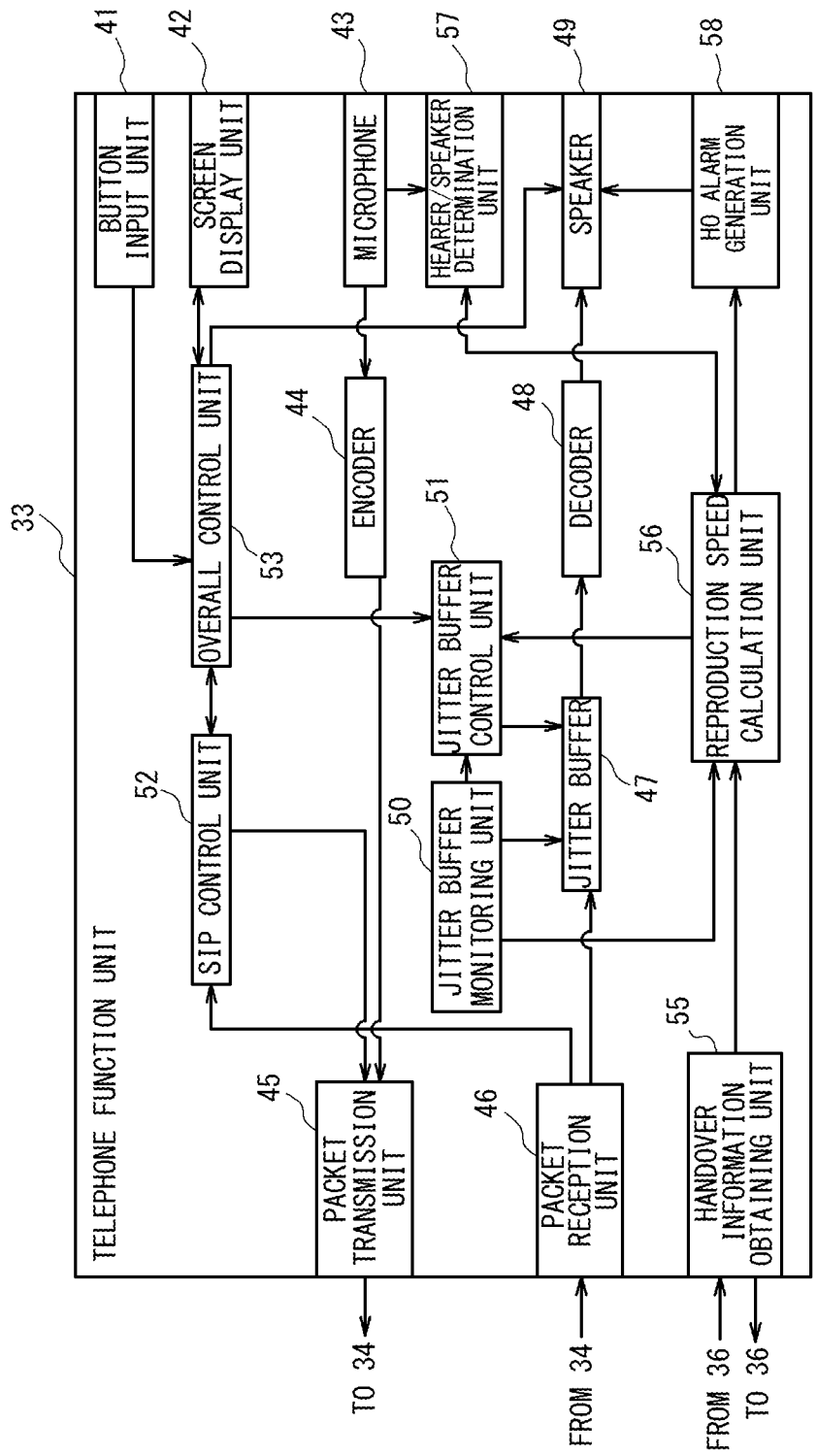
FIG. 5 is a functional block diagram illustrating a schematic constitution of a telephone unit of the wireless communication apparatus shown in FIG. 2.

FIG. 5 is a functional block diagram illustrating a schematic constitution of the telephone function unit 33 of the MN 11 shown in FIG. 2. The telephone function unit 33 constitutes an execution unit for executing an application for real-time communication. The telephone function unit 33 may be a softphone, for example, and similarly to the constitution of a known softphone, includes a button input unit 41, a screen display unit 42, a microphone 43, an encoder 44, a packet transmission unit 45, a packet reception unit 46, a jitter buffer 47, a decoder 48, a speaker 49, a jitter buffer monitoring unit 50, a jitter buffer control unit 51, an SIP control unit 52, and an overall control unit 53 for controlling the overall operations.

The overall control unit 53 obtains operation information by a user via the button input unit 41 and the screen display unit 42 and controls overall operations based on the information obtained. The SIP control unit 52 controls SIP procedure to start or end the call. During the call, the encoder 44 encodes voice data obtained by the microphone 43. Encoded data are inserted into packet by the packet transmission unit 45 and transmitted to the CN 12 via the communication processing unit 34.

Packets from the CN 12 received by the packet reception unit 46 via the communication processing unit 34 are once stored in the jitter buffer 47 and then read out. Payloads of the packets read out are decoded by the decoder 48 and output as reproduced voice from the speaker 49. A packet reception state of the jitter buffer 47 and the number of packets (data amount) in the jitter buffer 47 are monitored by the jitter buffer monitoring unit 50. Based on a result of monitoring, the jitter buffer control unit 51 controls a read-out speed of the packets from the jitter buffer 47 and a process to discard the received packets and the like.

According to the present embodiment, the telephone function unit 33 of the MN 11 further includes a handover information obtaining unit 55, a reproduction speed calculation unit 56, a hearer/speaker determination unit 57 and a handover alarm generation unit 58 (hereinafter, referred to as "HO alarm generation unit 58").

The handover information obtaining unit 55 monitors the handover information from the handover control unit 36 at predetermined intervals so as to obtain information on whether there is a handover schedule. If there is a handover schedule, the handover information obtaining unit 55 further obtains the HO start and completion times and NW delay times from the handover control unit 36 and provides the reproduction speed calculation unit 56 with some of the HO start and completion times and the NW delay times. In addition, the handover information obtaining unit 55 transmits a handover notification message (hereinafter, referred to as an "HO notification message"), which includes handover information and some of the HO start and completion times and the NW delay times, to the CN 12 via the communication processing unit 34. Subsequently, the handover information obtaining unit 55 monitors handover information from the handover control unit 36 at predetermined intervals, so as to obtain information whether Binding Update is transmitted from the MN 11 to the HA 23 and whether the MN 11 receives Binding Ack from the HA 23 (Whether handover is completed). If Binding Update is transmitted from the MN 11 to the HA 23, the handover information obtaining unit 55 informs the reproduction speed calculation unit 56 accordingly. When the MN 11 receives Binding Ack from the HA 23 and thereby handover is completed, the handover information obtaining unit 55 informs the reproduction speed calculation unit 56 that Binding Ack is received. In addition, in order to inform the CN 12 as well accordingly, the MN 11 transmits a Binding Ack notification message (hereinafter, referred to as a "BA notification message") to the CN 12 via the communication processing unit 34.

The reproduction speed calculation unit 56 constitutes a control unit for informing that handover is in progress and slowing down a reproduction speed of the application. The reproduction speed calculation unit 56 executes necessary calculation of times in relation to handover, based on the HO start and completion times and the NW delay times provided from the handover information obtaining unit 55. In addition, the reproduction speed calculation unit 56 instructs the jitter buffer control unit 51 to perform slow reproduction, in order to reproduce VoIP packets accumulated in a jitter buffer at a low speed. Moreover, the reproduction speed calculation unit 56 instructs the hearer/speaker determination unit 57 to determine whether the user is a hearer or a speaker by a predetermined time. Furthermore, the reproduction speed calculation unit 56 calculates a scheduled period (hereinafter, referred to as an "HO alarm scheduled period") to generate the HO alarm based on a result of determination by the hearer/speaker determination unit 57 and results of the necessary calculation stated above. When receiving notification that handover is completed (when receiving notification of Binding Ack) from the handover information obtaining unit 55, the reproduction speed calculation unit 56 instructs the HO alarm generation unit 58 to stop the HO alarm and also instructs the jitter buffer control unit 51 to cancel the slow reproduction.

The hearer/speaker determination unit 57 constitutes a determination unit for determining whether the user is a speaker or a hearer. The hearer/speaker determination unit 57 determines whether the user is a speaker or a hearer when receiving an instruction from the reproduction speed calculation unit 56 (detailed description thereof will be stated below). The hearer/speaker determination unit 57 transmits a result of determination to the reproduction speed calculation unit 56.

The HO alarm generation unit 58 constitutes a control unit for controlling to inform that handover is in progress. When receiving instruction from the reproduction speed calculation unit 56, the HO alarm generation unit 58 operates the speaker 49 to generate the HO alarm during handover, in order to prevent user's sense of anxiety and misunderstanding during the silent period.

(Constitution of the Telephone Function Unit 83 of the CN 12)

Figure 6:
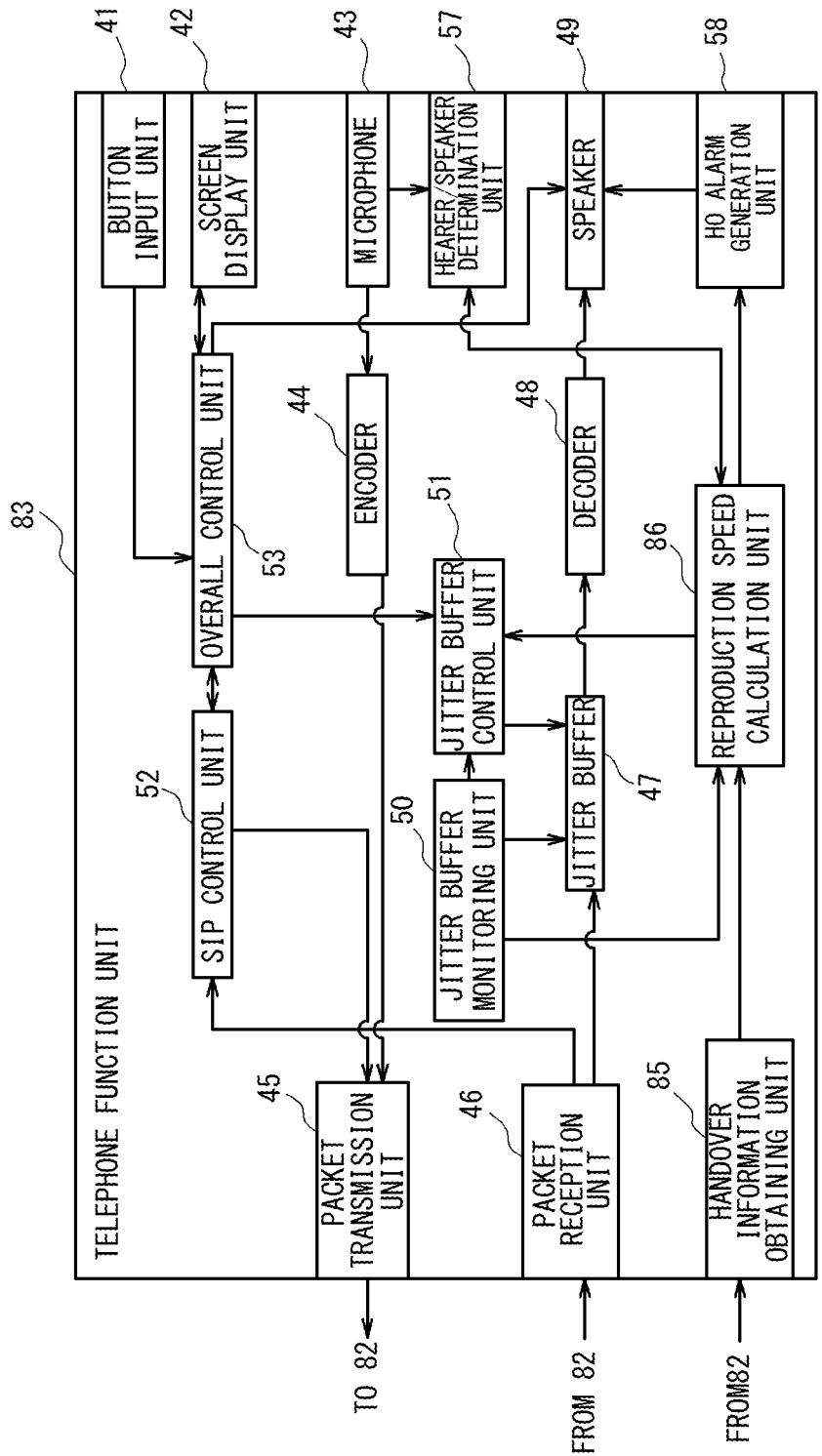
FIG. 6 is a functional block diagram illustrating a schematic constitution of a telephone unit of the communication apparatus shown in FIG. 3.

FIG. 6 is a functional block diagram illustrating a schematic constitution of the telephone function unit 83 of the CN 12 shown in FIG. 3. The telephone function unit 83 constitutes an execution unit for executing an application for real-time communication and may be a softphone, for example. According to the present embodiment, the handover information obtaining unit 85 and the reproduction speed calculation unit 86 have functions different from those of the handover information obtaining unit 55 and the reproduction speed calculation unit 56 of the MN 11, respectively. However, functional blocks with reference signs the same as those of the MN 11 have the same functions as functional blocks of the MN 11.

The handover information obtaining unit 85 monitors whether the communication processing unit 82 has received the HO notification message from the MN 11, at predetermine intervals. If the HO notification message is received, the handover information obtaining unit 85 extracts the HO start and completion times and the NW delay times from the HO notification message and provides such extracted times to the reproduction speed calculation unit 86. Then, the handover information obtaining unit 85 monitors whether the communication processing unit 82 has received the BA notification message from the MN 11, at predetermined intervals. If the BA notification message from the MN 11 is received, the handover information obtaining unit 85 informs the reproduction speed calculation unit 86 accordingly.

The reproduction speed calculation unit 86 constitutes a control unit for informing that handover is in progress and slowing down a reproduction speed of the application. The reproduction speed calculation unit 86 executes necessary calculation of times in relation to handover, based on the HO start and completion times and the NW delay times provided from the handover information obtaining unit 85. In addition, the reproduction speed calculation unit 86 instructs the jitter buffer control unit 51 to perform slow reproduction, in order to reproduce VoIP packets accumulated in the jitter buffer at a low speed. Moreover, the reproduction speed calculation unit 86 instructs the hearer/speaker determination unit 57 to determine whether the user is a hearer or a speaker by a predetermined time. Furthermore, the reproduction speed calculation unit 86 calculates the HO alarm scheduled period based on a result of determination by the hearer/speaker determination unit 57 and results of the necessary calculation stated above, and instructs the HO alarm generation unit 58 to generate the HO alarm at a predetermined time. The reproduction speed calculation unit 86 instructs the HO alarm generation unit 58 to stop the HO alarm based on the HO alarm scheduled period and the BA notification message from the handover information obtaining unit 85, and instructs the jitter buffer control unit 51 to cancel the slow reproduction.

The following is a detailed description of main function blocks of the MN 11 according to the present embodiment.

(Determination on Handover Schedule by the Handover Control Unit 36)

The handover control unit 36 determines handover schedule based on communication quality obtained from the first wireless I/F 31 and the second wireless OF 32. For example, during communication by forming the wireless link with the first wireless NW 15, if the communication quality obtained from the first wireless I/F 31 becomes worse than a handover schedule determination threshold and, simultaneously, the communication quality obtained from the second wireless OF 32 becomes better than the handover schedule determination threshold, the handover control unit 36 determines a handover schedule to the second wireless NW 16. That is, the handover control unit 36 determines to start preparation for handover. It is to be noted that communication quality of the second wireless NW 16, which is not being used for the call, may be obtained (measured) by receiving notification information transmitted from the access point 16a, for example.

(Obtainment of the HO Start and Completion Times and the NW Delay Times by the Handover Control Unit 36)

When determining the handover schedule, the handover control unit 36 obtains the HO start and completion times, which include a time Thosrm (sec) from a point to determine the handover schedule (point to transmit HO Msg in FIG. 7) to start of handover disconnecting wireless connection with the first wireless NW 15 and a time Thoesm (sec) from a point to determine the handover schedule to completion of handover by connecting to the second wireless NW 16 and receiving Binding Ack from the HA 23. In addition, the handover control unit 36 obtains the NW delay times, which include an uplink absolute delay time Tdup1 (sec) and a downlink absolute delay time Tddn1 (sec) of the first wireless NW 15 between the MN 11 and the HA 23, an uplink absolute delay time Taup1 (sec) and a downlink absolute delay time Tadn1 (sec) of the first wireless NW 15 between the MN 11 and the CN 12, an uplink absolute delay time Tdup2 (sec) and a downlink absolute delay time Tddn2 (sec) of the second wireless NW 16 between the MN 11 and the HA 23, and an uplink absolute delay time Taup2 (sec) and a downlink absolute delay time Tadn2 (sec) of the second wireless NW 16 between the MN 11 and the CN 12. The handover control unit 36 provides the telephone function unit 33 with some of the HO start and completion times and the NW delay times.

(Method to Obtain the Time Thosrm Before Start of Handover)

The time Thosrm before start of handover is calculated based on change rate $\Delta Rs$ (slope) of a radio state (Rs) in a unit time which determines the communication quality, as shown in FIG. 8(a) and (b), for example. Here, although the change rate $\Delta Rs$ can be obtained by being measured at a point when the handover schedule is determined as the radio state becomes lower than the handover schedule determination threshold, an average change rate $\Delta Rsrms$ is obtained over a period from a predetermined time before the handover schedule is determined to the time when the handover schedule is determined during the call, in the present embodiment.

Therefore, the handover control unit 36 calculates the change rate $\Delta Rs(t)$ in the unit time ($\Delta t$) of the radio state of the wireless communication network currently being used, by Formula 1 shown below at a predetermined timing. The handover control unit 36 stores a plurality of change rates $\Delta Rs(t)$ to a predetermined time before (for example, 2 seconds before) in a memory. Then, when the handover schedule is determined, the handover control unit 36 calculates the average change rate ΔRsrms over a period to the predetermined time before, from change rates stored at that timing. Here, it is assumed that the radio state is gradually deteriorated.

[Formula 1]

$$\Delta Rs(t) = |\{Rs(t) - Rs(t-\Delta t)\}/\Delta t| \quad (1)$$

Figure 8:
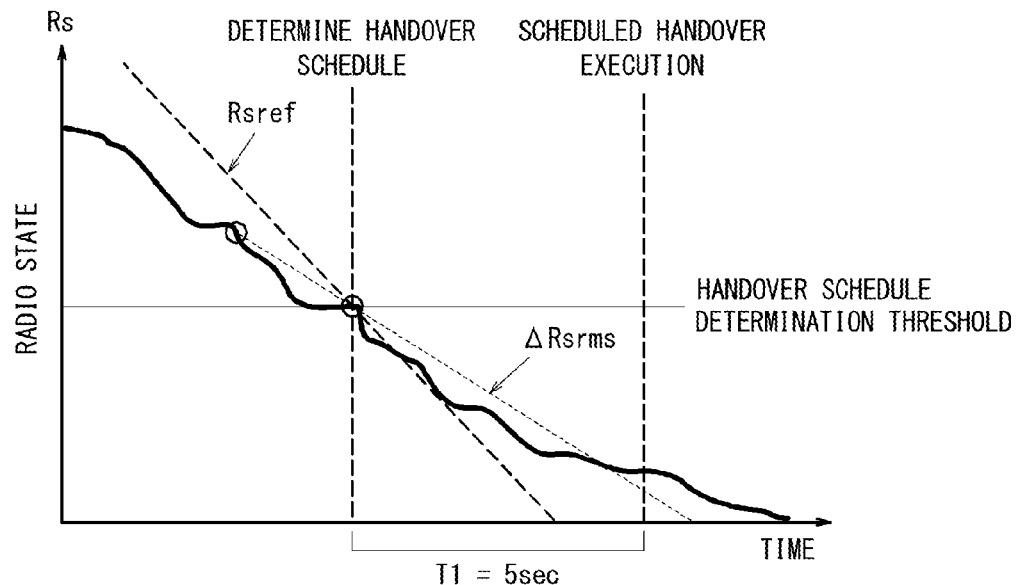
FIG. 8 is a diagram illustrating a method to calculate a handover start time by a handover control unit shown in FIG. 5.
Figure 8:
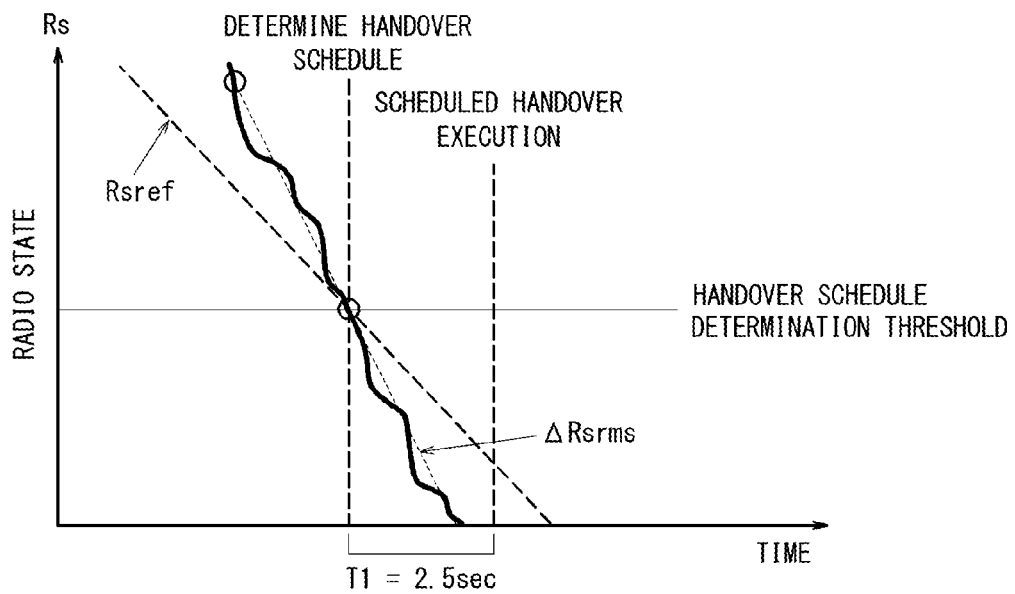

Subsequently, the handover control unit 36 determines whether the average change rate ΔRsrms calculated is smaller than a change rate threshold Rsref set in advance. As a result, if ΔRsrms≤Rsref is satisfied, that is, if the radio state changes gently, the time Thosrm before start of handover is set to a reference time Tref (5 seconds, for example) set in advance, as shown in FIG. 8(*a*).

In contrast, if ΔRsrms>Rsref is satisfied, that is, if the radio state changes rapidly, the handover control unit 36 calculates Thosrm=Tref (Rsref/ΔRsrms), for example. In this case, the handover control unit 36 sets the time Thosrm before start of handover shorter than the reference time Tref, as the average change rate ΔRsrms is greater. FIG. 8(*b*) shows a case when ΔRsrms>Rsref is satisfied and the handover control unit 36 sets the time Thosrm before start of handover to approximately half of the reference time Tref (2.5 seconds).

(Method to Obtain Time Thoesm Before Completion of Handover)

Figure 7:
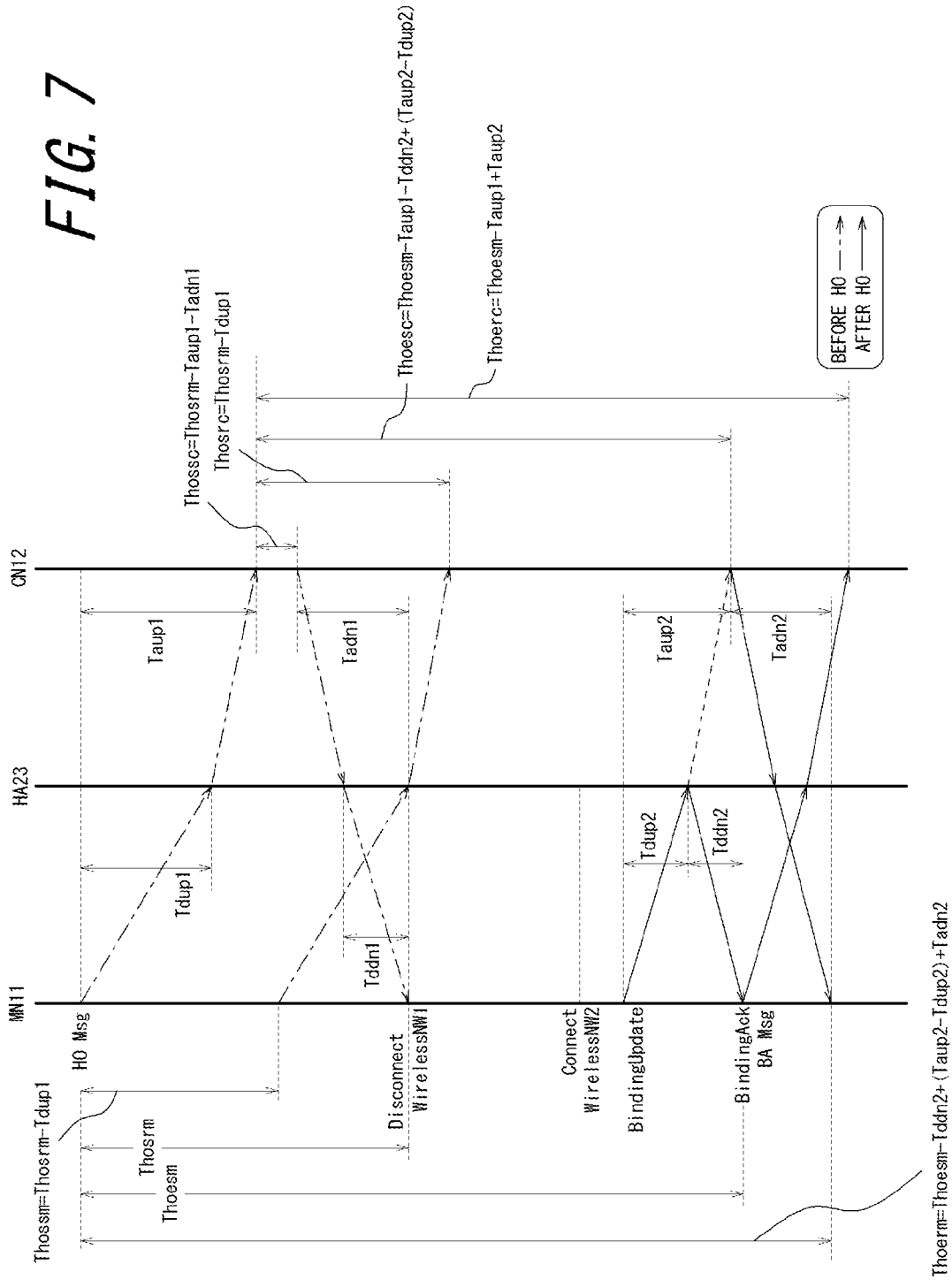
FIG. 7 is a diagram illustrating handover start and completion times and network delay times.

The time Thoesm before completion of handover is a time before the MN 11 receives Binding Ack from the HA 23. As shown in FIG. 7, the time Thoesm is influenced by the uplink absolute delay time Tdup2 and the downlink absolute delay time Tddn2 of the second wireless NW 16 between the MN 11 and the HA 23. However, a transmission time for the MN 11 to transmit Binding Update to the HA 23 may be at any time after the MN 11 connects to the second wireless NW 16. For example, a time necessary for the MN 11 to connect to the second wireless NW 16 may be calculated by storing a history of connection times in the past and obtaining an average thereof. Therefore, the time Thoesm before completion of handover may be obtained by adding the uplink absolute delay time Tdup2 and the downlink absolute delay time Tddn2 of the second wireless NW 16 between the MN 11 and the HA 23 to the transmission time of Binding Update set by the MN 11 based on the history of connection times in the past. In addition, if a time necessary to register CoA is already known on a side of the HA 23, the time Thoesm may be determined in consideration of such time.

(Method to Obtain NW Delay Times)

The uplink and downlink absolute delay times Tdup1 and Tddn1 of the first wireless NW 15 between the MN 11 and HA 23, the uplink and downlink absolute delay times Taup1 and Tadn1 of the first wireless NW 15 between the MN 11 and the CN 12, the uplink and downlink absolute delay times Tdup2 and Tddn2 of the second wireless NW 16 between the MN 11 and the HA 23, and the uplink and downlink absolute delay times Taup2 and Tadn2 of the second wireless NW 16 between the MN 11 and the CN 12 are obtained by methods to obtain the absolute delay times described below, for example.

After determining the handover schedule, the handover control unit 36 obtains the absolute delay time of each wireless communication network by using a handover scheme considered for IEEE 802.21. For IEEE 802.21 (Media Independent Handover (MIH)), as the handover scheme between different wireless networks (such as WiFi, WiMAX, a mobile phone and the like), it is considered to define a means to control handover (handover control unit 36 in FIG. 2) as an MIH user and MIHF (MIH Function) obtains radio information of a communication device based on a request by the MIH user and provides the MIH user with the radio information. It is also considered that the MIH user obtains the information from an information server in the network being connected through MIHF of its own terminal.

Figure 9:
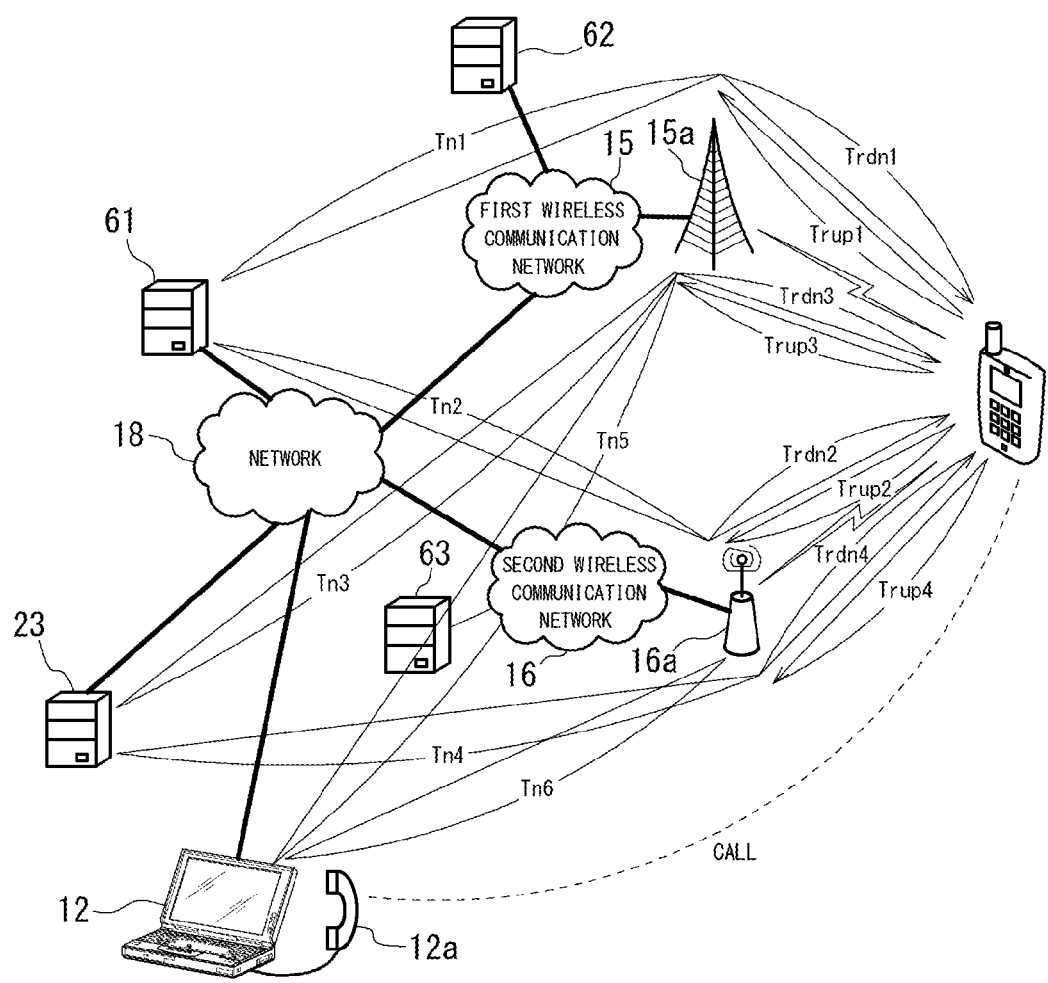
FIG. 9 is a diagram illustrating an exemplary method to obtain an absolute delay time by the handover control unit shown in FIG. 5.

FIG. 9 is a diagram illustrating the method to obtain the absolute delay times. In FIG. 9, a measuring server 61 operating to measure the absolute delay times is connected to the internet 18, which is a backbone network. In addition, a first information server 62 and a second information server 63 are connected to the first wireless NW 15 and the second wireless NW 16, respectively.

The first information server 62 holds a network delay reference time Tn1 from the measuring server 61, which is directly connected to the internet 18, to the base station 15*a*, and uplink and downlink wireless delay reference times Trup1, Trdn1 from the base station 15*a* to the MN 11, as references for measuring the delay times. Similarly, the second information server 63 holds a network delay reference time Tn2 from the measuring server 61 to the access point 16*a* and uplink and downlink wireless delay reference times Trup2, Trdn2 from the access point 16*a* to the MN 11.

Here, the network delay reference times Tn1 and Tn2 are obtained by measuring round trip times by transmitting and receiving packets (PING, RTCP and the like) between the base station 15*a* and the measuring server 61 and between the access point 16*a* and the measuring server 61, respectively, and dividing the round trip times by 2.

In addition, in order to calculate the uplink and downlink wireless delay reference times Trup1 and Trdn1 of the first wireless NW 15, the base station 15*a* transmits packets to the MN 11, and the MN 11 which received the packets records the reception times and then sends back the packets. Accordingly, respective delay times on uplink and downlink are calculated based on the transmission and reception times between the base station 15*a* and the NM 11.

Similarly, in order to calculate the uplink and downlink wireless delay reference times Trup2 and Trdn2 of the second wireless NW 16, the access point 16*a* transmits packets to the MN 11, and the MN 11 which received the packets records the reception time and then sends back the packets. Accordingly, respective delay times on uplink and downlink are calculated based on the transmission and reception times between the access point 16*a* and the MN 11. Tdup1 and Trup2 represent the uplink wireless delay reference times, whereas Trdn1 and Trdn2 represent the downlink wireless delay reference times.

The handover control unit 36 of the MN 11 obtains the network delay reference time Tn1 and the wireless delay reference times Trdn1 and Trup1 from the first information server 62 connected to the first wireless NW 15 via MIHF when connecting to the first wireless NW 15 of the handover source. In addition, the handover control unit 36 transmits and receives packets to/from correspondents to which the handover control unit 36 wishes to measure the delay times (here, the HA 23 and the CN 12), and measures round trip times (Tn3+Trdn3+Tn3+Trup3 and Tn5+Trdn3+Tn5+Trup3) between the MN 11 of its own and the HA 23 and between the MN 11 and the CN 12, respectively. Based on results thereof, the handover control unit 36 obtains one-way delay times (Tn3−Tn1 and Tn5−Tn1) between the HA 23 and the internet 18 and between the CN 12 and the internet 18, respectively, so as to calculate Tn3+Trup3 and Tn5+Trup3 corresponding to the uplink absolute delay times Tdup1 and Taup1 of the handover source between the MN 11 and the HA 23 and between MN 11 and the CN 12, respectively, and Tn3+Trdn3 and Tn5+Trdn3 corresponding to the downlink absolute delay times Tddn1 and Tadn1, respectively.

$$Tn3-Tn1=\{(Tn3+Trdn3+Tn3+Trup3)-(Tn1+Trdn1+Tn1+Trup1)\}/2$$

$$Tdup1=Tn3+Trup3=Tn1+Trup1+(Tn3-Tn1)$$

$$Tddn1=Tn3+Trdn3=Tn1+Trdn1+(Tn3-Tn1)$$

$$Tn5-Tn1=\{(Tn5+Trdn3+Tn5+Trup3)-(Tn1+Trdn1+Tn1+Trup1)\}/2$$

$$Taup1=Tn5+Trup3=Tn1+Trup1+(Tn5-Tn1)$$

$$Tadn1=Tn5+Trdn3=Tn1+Trdn1+(Tn5-Tn1) \quad \text{[Formula 2]}$$

In addition, in order to obtain the second NW delay reference time Tn2 and the wireless delay reference times Trup2, Trdn2, the handover control unit 36 transmits location information of the MN 11 to the second information server 63 of the second wireless NW 16 of a handover destination via the first information server 62 of the first wireless NW 15 currently being connected. Thereby, the handover control unit 36 requires the second information server 63 to transmit the network delay reference time Tn2 and the wireless delay reference times Trup2, Trdn2. In consideration of the location information and the number of connected users of each access point, the second information server 63 transmits the network delay reference time Tn2 and the wireless delay reference times Trup2, Trdn2 of the access point 16a, to which the MN 11 is expected to connect, to the MN 11 via the first information server 62.

The handover control unit 36 receives the second NW delay reference time Tn2 and the wireless delay reference dimes Trup2, Trdn2 transmitted from the second information server 63. The handover control unit 36, by using such information obtained and calculated values (Tn4−Tn2 and Tn6−Tn2), calculates Tn4+Trup4 and Tn6+Trup4 respectively corresponding to the uplink absolute delay times Tdup2 and Taup2 of the handover destination between the MN 11 and the HA 23 and between the MN 11 and the CN 12, and Tn4+Trdn4 and Tn6+Trdn4 respectively corresponding to the downlink absolute delay times Tddn2 and Tadn2.

$$Tdup2=Tn4+Trup4=(Tn2+Trup2)+(Tn4-Tn2)$$

$$Tddn2=Tn4+Trdn4=(Tn2+Trdn2)+(Tn4-Tn2)$$

$$Taup2=Tn6+Trup4=(Tn2+Trup2)+(Tn6-Tn2)$$

$$Tadn2=Tn6+Trdn4=(Tn2+Trdn2)+(Tn6-Tn2) \quad \text{[Formula 3]}$$

The absolute delay times Tdup1, Tddn1, Tdup2, Tddn2, Taup1, Tadn1, Taup2, Tadn2, obtained by the methods to obtain the absolute delay times stated above, are stored in a memory (not shown) in the handover control unit 36 for each wireless communication network.

Thereby, the handover control unit 36 obtains the HO start and completion times including the time Thosrm (sec) before start of handover disconnecting wireless connection with the first wireless NW 15 and the time Thoesm (sec) before completion of handover by connecting to the second wireless NW and receiving Binding Ack from the HA 23. The handover control unit 36 further obtains NW delay times including the uplink and downlink absolute delay times Tdup1 (sec) and Tddn1 (sec) of the first wireless NW 15 between the MN 11 and the HA 23, the uplink and downlink absolute delay times Taup1 (sec) and Tadn1 (sec) of the first wireless NW 15 between the MN 11 and the CN 12, the uplink and downlink absolute delay times Tdup2 (sec) and Tddn2 (sec) of the second wireless NW 16 between the MN 11 and the HA 23, and the uplink and downlink absolute delay times Taup2 (sec) and Tadn2 (sec) of the second wireless NW 16 between the MN 11 and the CN 12. The handover control unit 36 provides the handover information obtaining unit 55 with the HO start and completion times and the NW delay times obtained.

(Operation of the Handover Information Obtaining Unit 55)

The handover information obtaining unit 55 provides the reproduction speed calculation unit 56 with the time Thosrm before start of handover, the time Thoesm before completion of handover, the uplink absolute delay time Tdup1 of the first wireless NW 15 between the MN 11 and the HA 23, the uplink and downlink absolute delay times Tdup2 and Tddn2 of the second wireless NW 16 between the MN 11 and the HA 23, the uplink and downlink absolute delay times Taup2 and Tadn2 of the second wireless NW 16 between the MN 11 and the CN 12, among the HO start and completion times and the NW delay times obtained from the handover control unit 36.

In addition, the handover information obtaining unit 55 provides the reproduction speed calculation unit 86 of the CN 12, via the communication processing unit 34, with the time Thosrm before start of handover from a point of the handover schedule determination, the time Thoesm before completion of handover, the uplink absolute delay time Tdup1 of the first wireless NW 15 between the MN 11 and the HA 23, the uplink and downlink absolute delay times Tdup2 and Tddn2 of the second wireless NW 16 between the MN 11 and the HA 23, the uplink and downlink absolute delay times Taup1 and Tadn1 of the first wireless NW between the MN 11 and the CN 12, and the uplink absolute delay time Taup2 of the second wireless NW between the MN 11 and the CN 12, among the HO start and completion times and the NW delay times obtained from the handover control unit 36, as the HO notification message.

(Operation of the Reproduction Speed Calculation Unit 56)

When obtaining the HO start and completion times and the NW delay times, the reproduction speed calculation unit 56 calculates times in relation to handover to be used as references for calculation of the HO alarm scheduled period. FIG. 7 is a diagram illustrating times obtained by the handover information obtaining unit 55 and times calculated by the reproduction speed calculation unit 56. As stated above, the time Thosrm before start of handover and the time Thoesm before completion of handover are already obtained by the handover control unit 36. By using Thosrm, Theosm and the NW delay times, the reproduction speed calculation unit 56 obtains a time Thossm until which the MN 11 can transmit a last packet to the HA 23 via the first wireless NW 15 and a time Thoerm before the MN 11 can receive a first packet from the CN 12 via the second wireless NW 16 by using the following formula, as shown in FIG. 7. (A detailed description of calculation of the HO alarm scheduled period by using Thosrm, Thoesm, Thossm and Thoerm will be described below.)

$$Thossm(\text{sec})=Thosrm-Tdup1$$

$$Thoerm(\text{sec})=Thoesm-Tddn2+(Taup2-Tdup2)+Tadn2 \quad \text{[Formula 4]}$$

(Notification to the Hearer/Speaker Determination Unit 57 by the Reproduction Speed Calculation Unit 56)

In addition, the reproduction speed calculation unit 56 instructs the hearer/speaker determination unit 57 to start determination whether the user is a hearer or a speaker before the time Thossm until which the MN 11 can transmit the last packet to the HA 23 via the first wireless NW 15.

(Calculation of a Time Up to Start of Slow Reproduction by the Reproduction Speed Calculation Unit 56)

In order to shorten a silent period due to packet loss, the reproduction speed calculation unit 56 instructs the jitter buffer control unit 51 to reproduce VoIP data, accumulated in the jitter buffer 47, at a low speed. Such slow reproduction is performed prior to the time to start handover (before Thosrm has passed). When Tsttslowplay (sec) represents a time up to start of slow reproduction of the VoIP application before a lapse of Thosrm, Tsttslowplay may be calculated by one of a first and a second calculation methods described below, for example.

(a) First Calculation Method

The time Tsttslowplay up to start of slow reproduction may be calculated by the following formula, by using Vn (sec) representing a standard reproduction speed, Vs (sec/sec) representing a reproduction speed at slow reproduction, and a time Tslowsup (sec) representing a time desired to shorten the silent period.

$$T_{stt}\text{slowplay} = (T_{slowsup} \times V_s) / (V_n - V_s) \quad \text{[Formula 5]}$$

(b) Second Calculation Method

The time Tsttslowplay up to start of slow reproduction may be set at any time between determination of the handover schedule and start of handover, for example. For MN 11, the Tsttslowplay may be set as a percentage of the time Thosrm before start of handover. That is, it is possible to set Tsttslowplay to half or 30% of Thosrm. It is also possible to set Tsttslowplay equal to Thosrm and start slow reproduction of the VoIP application immediately after determination of the handover schedule.

When the reproduction speed calculation unit 56 instructs the HO alarm generation unit 58 to start, the reproduction speed calculation unit 56 may instructs the jitter buffer control unit 51 to discard all packets in the jitter buffer 47 and stop reproduction without slow reproduction until there is no packets in the jitter buffer.

(Calculation of the HO Alarm Scheduled Period by the Reproduction Speed Calculation Unit 56)

The reproduction speed calculation unit 56 calculates the HO alarm scheduled period Thobep by using a calculation result in relation to handover obtained by the above calculation and the time up to start of slow reproduction. If the user is a speaker at start of handover, it is preferred to generate the HO alarm immediately so as to prevent loss of an utterance packet. If the user is a hearer, it is preferred to generate the HO alarm after end of reproduction of voice packets already received. In addition, if the user is a speaker when handover is completed, it is preferred to stop the HO alarm immediately for prompt resumption of utterance. If the user is a hearer, it is preferred to stop the HO alarm after waiting for a predetermined amount of packets to be accumulated in the jitter buffer 47 (after waiting until the VoIP application can be reproduced). Therefore, as described below, the HO alarm scheduled period Thobep is set in different manners depending on whether the user is a speaker or a hearer.

(a) The HO Alarm Scheduled Period if the User of the MN 11 is a Speaker

Figure 10:
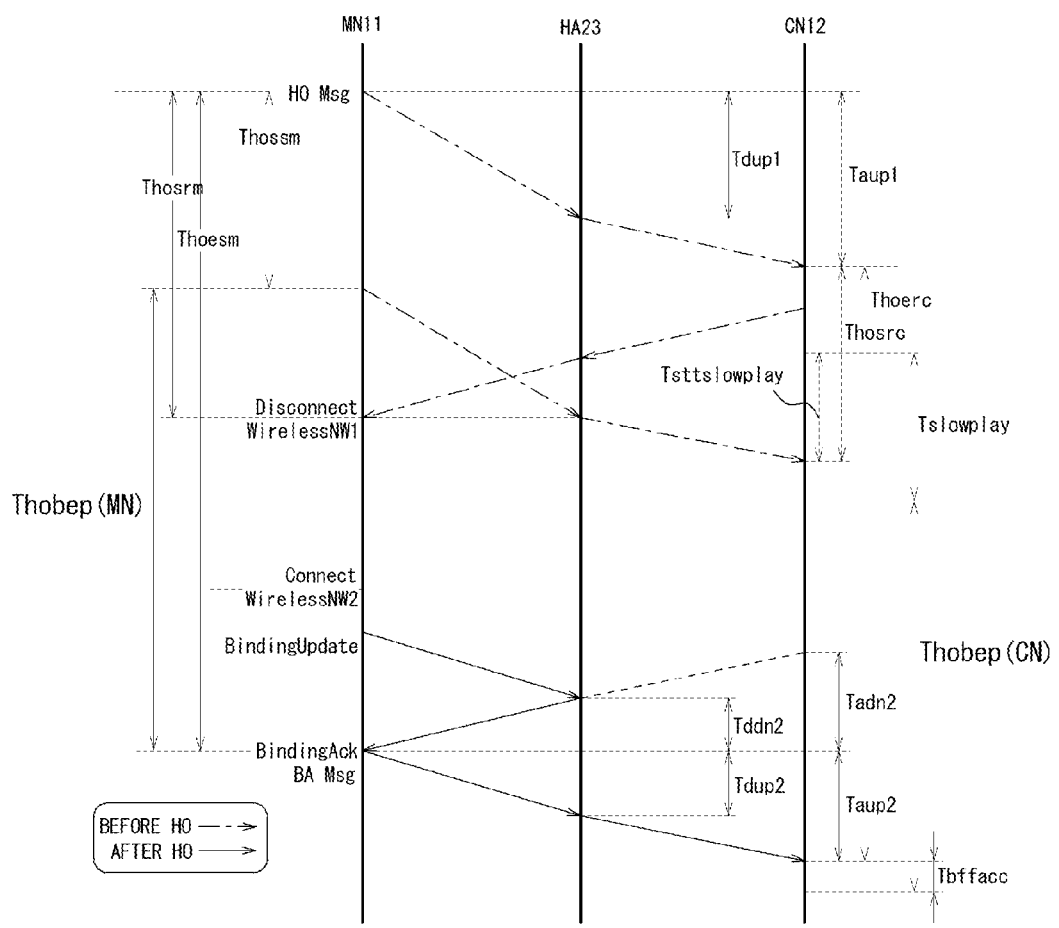
FIG. 10 is a diagram illustrating an HO alarm scheduled period calculated by a reproduction speed calculation unit shown in FIG. 5 and FIG. 6.

FIG. 10 is a diagram illustrating a sequence of handover if the MN 11 is a speaker and the CN 12 is a hearer. If the user is the speaker, the MN 11 generates the HO alarm immediately at handover in order to prevent loss of the utterance packet. As shown in FIG. 10, the HO alarm scheduled period Thobep (MN) of the MN 11 is a period from a time when the MN 11 can transmit a last packet to the HA 23 via the first wireless NW 15 (at a point when Thossm has passed) to a time when the handover is completed (at a point when Thoesm has passed). Therefore, the reproduction speed calculation unit 56 may obtain the HO alarm scheduled period Thobep (MN) by the following formula.

[Formula 6]

$$T_{hobep}(MN) = T_{hoesm} - T_{hossm} \quad (6)$$

(b) The HO Alarm Scheduled Period if the User of the MN 11 is a Hearer

Figure 11:
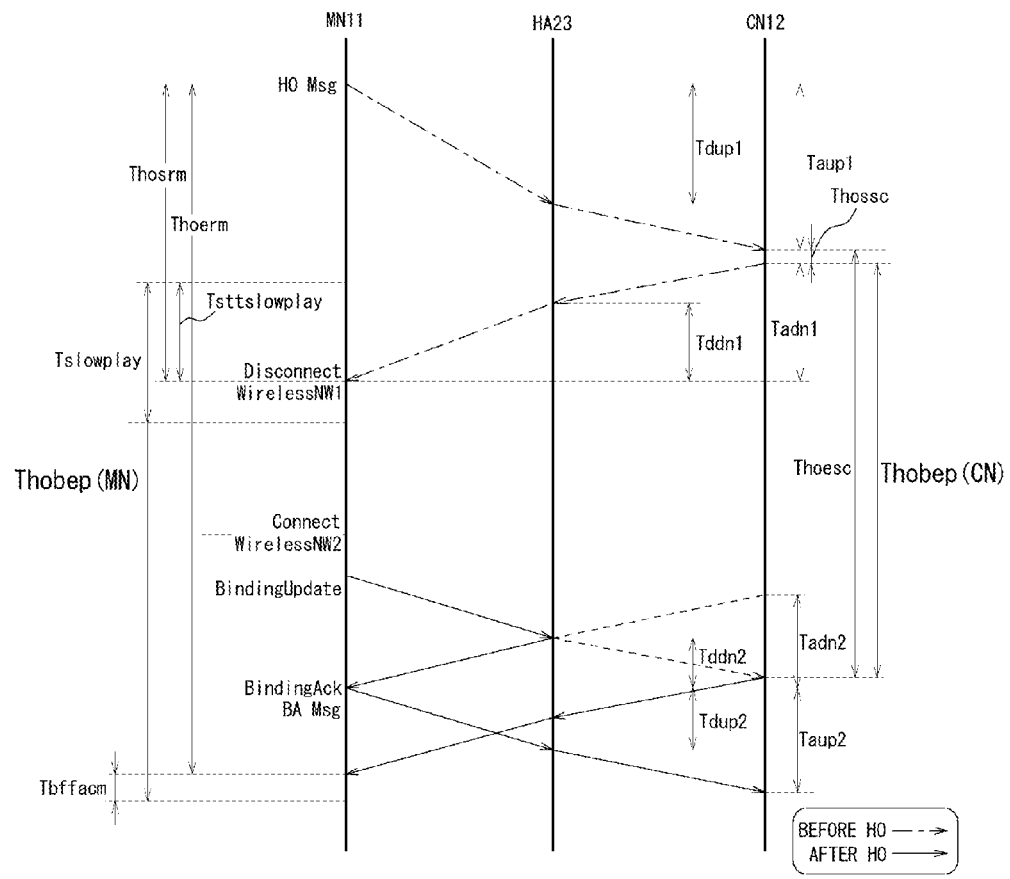
FIG. 11 is a diagram illustrating an HO alarm scheduled period calculated by a reproduction speed calculation unit shown in FIG. 5 and FIG. 6.

FIG. 11 is a diagram illustrating a sequence of handover if the MN 11 is a hearer and the CN 12 is a speaker. If the user of MN 11 is the hearer, slow reproduction of the jitter buffer is performed at handover, from a time as long as Tsttslowplay up to start of slow reproduction calculated by the reproduction speed calculation unit 56 before the time to start handover (before Thosrm has passed). Then, the reproduction speed calculation unit 56 continues to obtain the number of voice packets from the jitter buffer monitoring unit 50 at predetermined intervals. In order to determine whether a packet is a voice packet or a silent packet, it is possible to use codec such as Speex, which has a function to determine voice/silent and, when the packet is a silent packet, transmit a packet different from the one transmitted when the packet is a voice packet. When there is no voice packet, the reproduction speed calculation unit 56 instructs the HO alarm generation unit 58 to start the HO alarm. In contrast, a time to stop the HO alarm is not simply the time Thoesm to complete handover, unlike that for when the user is a speaker, because the MN 11 needs to wait for arrival of packets to be reproduced from the CN 12 (that is, after Thoerm) and also because the real-time application such as VoIP starts reproduction of voice after a predetermined amount of packets are accumulated in the jitter buffer in order to deal with deviations in packet arriving intervals. As shown in FIG. 11, when Tsttslowplay represents the time up to start of slow reproduction, Tslowplay represents a slow reproduction time and Tbffacm represents a time necessary for the predetermined amount of packets to be accumulated, the reproduction speed calculation unit 56 may obtain the HO alarm scheduled period Thobep (MN) by the following formula.

$$T_{hobep}(MN) = (T_{hoerm} + T_{bffacm}) - (T_{hosrm} - T_{stt}\text{slowplay} + T\text{slowplay}) \quad \text{[Formula 7]}$$

Figure 12:
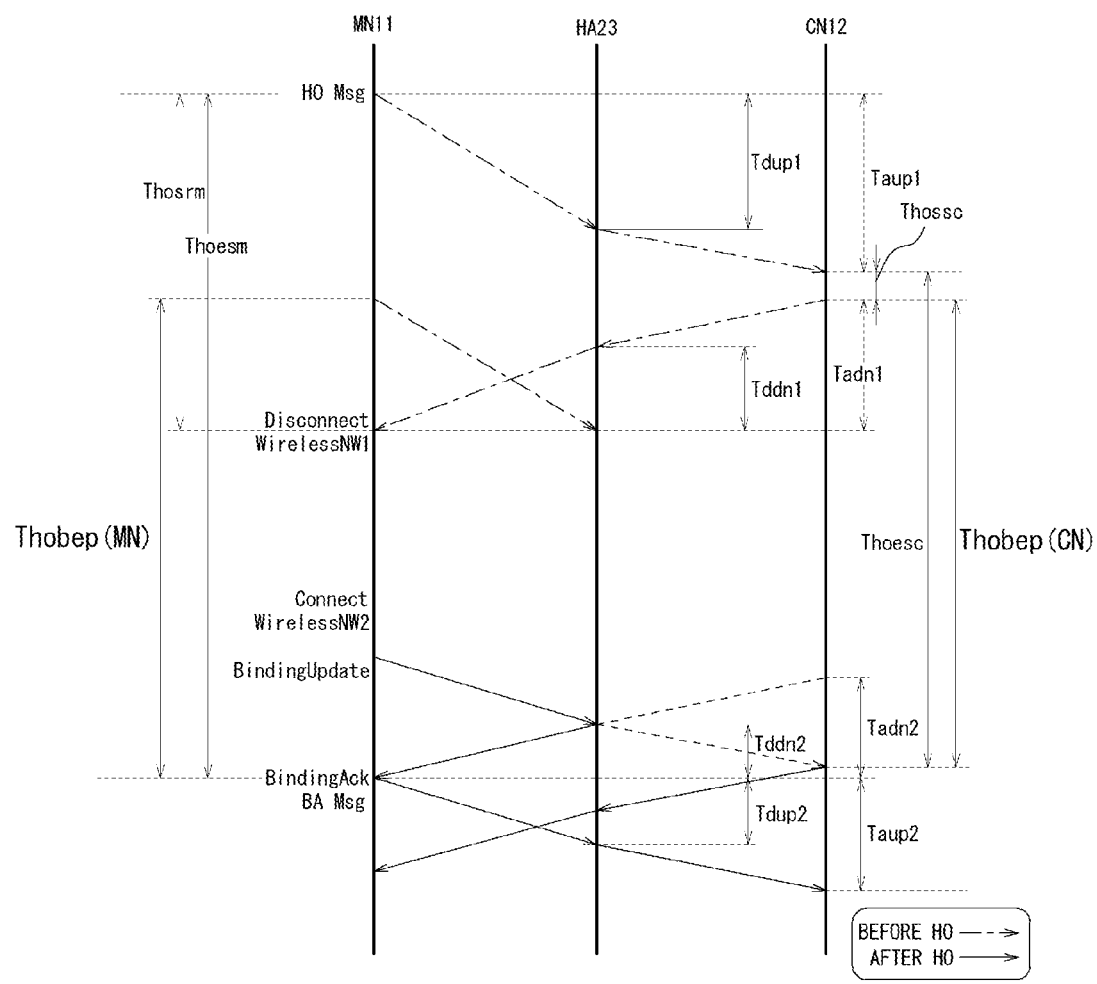
FIG. 12 is a diagram illustrating an HO alarm scheduled period calculated by a reproduction speed calculation unit shown in FIG. 5 and FIG. 6.

FIG. 12 is a diagram illustrating when both of the MN 11 and the CN 12 are speakers. In this case, both of the MN 11 and the CN 12 are hearers as well. However, in order to prioritize to prevent packet loss as the speaker, the MN 11 immediately starts the HO alarm at handover. That is, the HO alarm scheduled period Thobep (MN) of the MN 11 becomes the same as that in the above Formula 6.

(HO Alarm Stop Notification by the Reproduction Speed Calculation Unit 56)

When receiving a notification from the HA 23 that Binding Ack is received, the reproduction speed calculation unit 56 starts obtaining the amount of packets accumulated in the jitter buffer 47 from the jitter buffer monitoring unit 50 at predetermined intervals. If the user of the MN 11 is the speaker, the reproduction speed calculation unit 56 instructs the HO alarm generation unit 58 to stop the HO alarm so as to stop the HO alarm immediately after receiving the notification. Subsequently, the reproduction speed calculation unit 56 instructs the jitter buffer control unit 51 to start normal reproduction. If the user of the MN 11 is the hearer, the reproduction speed calculation unit 56 waits until the amount of the packets accumulated in the jitter buffer 47 exceeds a standard amount before instructing the HO alarm generation unit 58 to stop the HO alarm, and then instructs the jitter buffer control unit 51 to start normal reproduction.

(Slow Reproduction Method of VoIP Data by the Jitter Buffer Control Unit 51)

When being instructed by the reproduction speed calculation unit 56, the jitter buffer control unit 51 controls reproduction of received packets by one of a first and a second reproduction speed control methods described below, for example.

(a) First Reproduction Speed Control Method

It is calculated that TR=TR1/(Vs/Vn) where TR1 represents a read-out interval of packets from the jitter buffer 47 corresponding to the standard reproduction speed Vn and TR represents read-out intervals of packets from the jitter buffer 47 corresponding to a slow reproduction speed Vs. For example, in order to render the reproduction speed Vs to be 80% of the standard reproduction speed Vn (k=0.8) for the VoIP application which reads out and reproduces the packets in the jitter buffer 47 at intervals of 20 msec at the standard reproduction speed Vn, the read-out interval TR of the packets from the jitter buffer 47 is calculated as TR=20/0.8(msec).

(b) Second Reproduction Speed Control Method

When the control of the reproduction speed for handover is started, the jitter buffer control unit 51 records a combination of a time stamp of a packet (first packet) reproduced immediately thereafter and a reproduction time thereof. The jitter buffer control unit 51 reads out packets thereafter from the jitter buffer 47 and reproduces at time Tv in Formula 8 shown below. In Formula 8, TD represents the delay time and an initial value thereof is zero.

[Formula 8]

$$Tv = (\text{time stamp of packet} - \text{time stamp of first packet}) + (\text{reproduction time of first packet} + TD) \quad (8)$$

Figure 13:
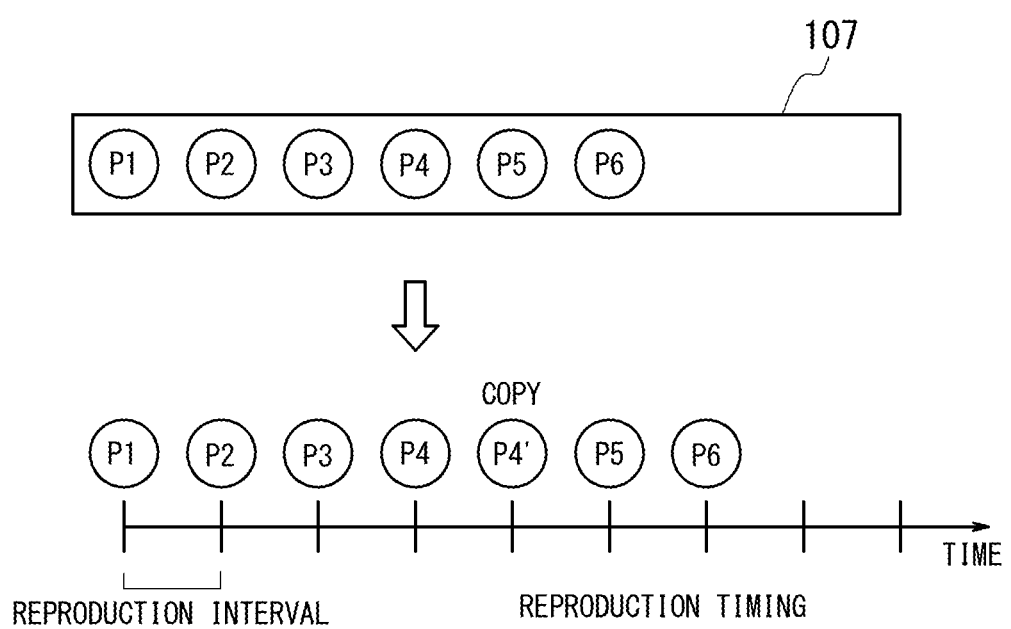
FIG. 13 is a diagram illustrating an exemplary method to control a reproduction speed of voice packets by a jitter buffer control unit shown in FIG. 5 and FIG. 6.

Here, when the packets are read out from the jitter buffer 47, a packet read out at $[\{Vn/(Vn-Vs)\}-1]$th is copied and stored in a memory of the decoder 48. After reproduction of the original packet, the copied packet is read out and reproduced at next reproduction timing. For example, when the reproduction speed Vs is set to be 80% of the standard reproduction speed Vn, four sequential packets P1 to P4 in the jitter buffer 47 are read out and reproduced sequentially, as shown in FIG. 13. The fourth packet P4 is copied, and a copied packet P4' is reproduced at next reproduction timing after reproduction of the original packet P4. Then, when a packet P5 is read out from the jitter buffer 47, TD in the above Formula 8 is increased as long as the time of reproduction interval by copying. It is to be noted that, if the packet to be read out at $[\{Vn/(Vn-Vs)\}-1]$th is not in the jitter buffer 47 because of not being received yet or being discarded, the same processing is performed on a packet of a next reproduction timing.

(Method to Determine Whether Hearer or Speaker)

When receiving an instruction from the reproduction speed calculation unit 56, the hearer/speaker determination unit 57 determines whether the user is a hearer or a speaker by a predetermined time and transmits a result of determination to the reproduction speed calculation unit 56.

When receiving an instruction from the reproduction speed calculation unit 56, the hearer/speaker determination unit 57 monitors voice input to the microphone 43 for a predetermined period. If voice is input into the microphone 43 continuously, the hearer/speaker determination unit 57 determines that the user is a "speaker", whereas it determines that the user is a "hearer" if voice is not input to the microphone 43 continuously.

The hearer/speaker determination unit 57 may determine based on a speaker determination coefficient Rtalk by using a weighting coefficient W(x) and a binary function F(x), which indicates existence of voice input. The binary function F(x) indicates whether there is voice input by binary. If I(x)>Ith where I(x) represents intensity of a voice signal input to the microphone 43 and Ith represents a threshold to determine that there is voice input, F(x)=1 is satisfied, whereas F(x)=0 is satisfied in other cases. The speaker determination threshold Rtalk may be calculated by using the weighting coefficient W(x) and the binary function F(x), as shown below. Here, Thostt represents a determination end time and T is a coefficient indicating time. T is increased gradually after start of determination and determination is ended at Thostt.

$$R\text{talk} = \Sigma\{W(Thostt-T) \times F(1(T))\} / \Sigma\{W(Thostt-T)\} \quad \text{[Formula 9]}$$

If Rth represents the threshold for determining that the user is a speaker, the hearer/speaker determination unit 57 can determine that the user is a speaker when Rtalk>Rth is satisfied and that the user is a hearer when Rtalk>Rth is not satisfied. For example, by setting such that the weighting coefficient W(x) to be greater as a value of x is smaller, it is possible to set a greater W(x) when a difference between Thostt and T is small, that is, when it is closer to the end of determination.

(Operation of the Ho Alarm Generation Unit 58)

The HO alarm generation unit 58 receives an instruction to start the HO alarm and the HO alarm scheduled period Thobep from the reproduction speed calculation unit 56 and controls the speaker 49 to generate the HO alarm. Although a period to generate the HO alarm is based on the HO alarm scheduled period Thobep, the HO alarm generation unit 58 may stops the HO alarm when receiving a notification from the reproduction speed calculation unit 56, as handover may not be always completed in the HO alarm scheduled period.

It is possible to generate the HO alarm in a variety of manners as described below.

Manners to generate the HO alarm by the HO alarm generation unit 58 receiving the instruction by the reproduction speed calculation unit 56 may be one of first to third HO alarm generation manners described below.

(a) First HO Alarm Generation Manner

Figure 14:
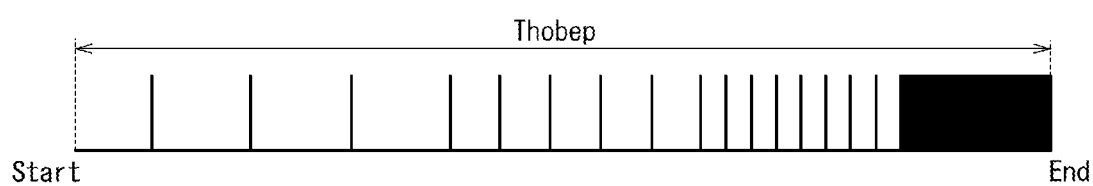
FIG. 14 is a diagram illustrating an activation state of an HO alarm by an HO alarm generation unit shown in FIG. 5 and FIG. 6.

The HO alarm generation unit 58 generates cyclic beep sound as the HO alarm and may set the HO alarm scheduled period so as to accelerate a generation cycle in accordance with an elapsed time, as shown in FIG. 14, for example. By setting generation timing in accordance with progress of handover in this manner, it is possible to indicate a time before completion of handover to the user. In addition, when handover is completed (when being instructed to stop the HO alarm by the reproduction speed calculation unit 56) the HO alarm generation unit 58 may generate a particular sound to notify the user accordingly. Moreover, if the HO alarm scheduled period does not match an actual time of completion of handover and there is a time lag after the HO alarm scheduled period has passed and before being instructed to stop the HO alarm by the reproduction speed calculation unit 56, the HO alarm generation unit 58 may continue to generate the HO alarm by maintaining a last cycle after the HO alarm scheduled period has passed.

(b) Second HO Alarm Generation Manner

The HO alarm generation unit 58 generates an audio guidance as the HO alarm, for example. The audio guidance may be such as "5 seconds before handover completion" or "5 seconds . . . 3, 2, 1", for example.

(c) Third HO Alarm Generation Manner

In addition, the user can arbitrarily set music or voice as the HO alarm, like a ringtone and a ring-back tone of a mobile phone.

The following is a detailed description of main function blocks of the CN 12 according to the present embodiment, in particular, the handover information obtaining unit 85 and the reproduction speed calculation unit 86. The function blocks having the same reference signs as those of the MN 11 have equivalent functions. Accordingly, above descriptions of the jitter buffer control unit 51, the hearer/speaker determination unit 57 and the HO alarm generation unit 58 of the MN 11 may be employed as the descriptions of the function blocks of the CN 12 by replacing the "reproduction speed calculation unit 56" with a "reproduction speed calculation unit 86" in the description if necessary.

(Operation of the Handover Information Obtaining Unit 85)

The handover information obtaining unit 85 monitors whether the communication processing unit 82 has received the HO notification message from the MN 11 at predetermined intervals. If the HO notification message is received, the handover information obtaining unit 85 extracts the HO start and completion times and the NW delay times from the HO notification message and provides extracted times to the reproduction speed calculation unit 86. Then, the handover information obtaining unit 85 monitors whether the communication processing unit 82 has received the BA notification message from the MN 11 at predetermined intervals. If the BA notification message from the MN 11 is received, the handover information obtaining unit 85 informs the reproduction speed calculation unit 86 accordingly.

(Operation of the Reproduction Speed Calculation Unit 86)

When obtaining the HO start and completion times and the NW delay times extracted from the HO notification message, the reproduction speed calculation unit 86, as shown in FIG. 7, calculates times from receiving the HO notification message to be used as a standard for calculation of the HO alarm scheduled period: the time Thossc until which the CN 12 can transmit the last packet to the MN 11 via the first wireless NW 15, the time Thosrc until which the CN 12 can receives the last packet from the MN 11 via the first wireless NW 15 (an arrival time of a packet transmitted by the MN 11 to the CN 12 at the time Thossm), the time Thoerc before the CN 12 can receive the first packet from the MN 11 via the second wireless NW 16 (arrival time of the BA notification message from the MN 11 to the CN 12) and the time Thoesc before the CN 12 can transmit the first packet to the MN 11 via the second wireless NW 16, by using the following formula. (It is to be noted that a detailed description of calculation of the HO alarm generation period by using Thosrc, Thossc, Thoerc and Thoesc will be described below.)

$Thosrc(\text{sec}) = Thosrm - Tdup1$ $Thossc(\text{sec}) = Thosrm - Taup1 - Tadn1$ $Thoerc(\text{sec}) = Thoesm - Taup1 + Taup2$ $Thoesc(\text{sec}) = Thoesm - Taup1 - Tddn2 + (Taup2 - Tdup2)$ [Formula 10]

Here, as shown in FIG. 7 and Formula 10, the time Thoesc before the CN 12 can transmit the first packet to the MN 11 via the second wireless NW 16 is defined as a time when the CN 12 receives a signal if the HA 23 receives the Binding Update from the MN 11 and transmits a packet to the CN 12 immediately thereafter. This is because it is contemplated that the HA 23 can transfer a packet, transmitted from the CN 12 to the MN 11, to the MN 11 after the HA 23 has received Binding Update from the MN 11. In Formula 10, in consideration of a CoA registration processing time at the HA 23 and the like, the Time Thoesc is defined such that the first packet from the CN 12 to the MN 11 arrives the HA 23 when a round trip time of a packet in the second wireless NW 16 (Taup2+Tadn2)−(Tdup2+Tdn2) has passed after the HA 23 receives Binding Update. However, it is possible to define the Thoesc such that the first packet from the CN 12 to the MN 11 arrives at the HA 23 immediately after the HA 23 receives Binding Update. In addition, it is also possible to define the time Thoesc as the same time as the time Thoerc before the CN 12 can receive the first packet from the MN 11 via the second wireless NW 16 (arrival time of the BA notification message from the MN 11 to the CN 12), such that the CN 12 transmits the first packet to the MN 11 after confirming that CoA is registered with the HA 23.

(Notification to the Hearer/Speaker Determination Unit by the Reproduction Speed Calculation Unit 86)

In addition, the reproduction speed calculation unit 86 instructs the hearer/speaker determination unit 57 to determine whether the user is a hearer or a speaker by the time Thossc when the CN 12 can transmit the last packet to the MN 11 via the first wireless NW 15.

(Calculation of Time Up to Start of Slow Reproduction by the Reproduction Speed Calculation Unit 86)

In order to shorten the silent period caused by packet loss, the reproduction speed calculation unit 86 instructs the jitter buffer control unit 51 to reproduce the VoIP data accumulated in the jitter buffer 47 at a low speed. This slow reproduction is performed prior to the time Thosrc until which the CN 12 can receive the last packet from the MN 11 via the first wireless NW 15. If Tsttslowplay (sec) represents a time up to start of slow reproduction of the VoIP application before Thosrc, Tsttslowplay may be calculated one of a first or a second calculation methods described below.

(a) First Calculation Method

The time Tsttslowplay up to start of slow reproduction may be calculated by the following formula where Vn (sec/sec) is the standard reproduction speed, Vs (sec/sec) is the reproduction speed at slow reproduction, and Tslowsup (sec) is a time desired to shorten the silent period.

$Tsttslowplay = (Tslowsup \times Vs)/(Vn - Vs)$ [Formula 11]

(b) Second Calculation Method

The time Tsttslowplay up to start of slow reproduction may be set as a percentage of a period from reception of the HO notification message to a time when a packet does not arrive from the MN 11 (to a lapse of Thosrc). That is, it is possible to set Tsttslowplay to half or 30% of Thosrc. It is also possible to set Tsttslowplay equal to Thosrc and start slow reproduction immediately after reception of the HO notification message.

In addition, when the reproduction speed calculation unit 86 instructs the HO alarm generation unit 58 to start, the reproduction speed calculation unit 86 may instructs the jitter buffer control unit 51 to discard all packets in the jitter buffer 47 and stop reproduction without slow reproduction until there is no packet in the jitter buffer.

(Calculation of the HO Alarm Scheduled Period by the Reproduction Speed Calculation Unit 86)

The reproduction speed calculation unit 86 calculates the HO alarm scheduled period Thobep by using a calculation result in relation to handover obtained in the above calculation and the time up to start of slow reproduction. If the user is a speaker at start of handover, it is preferred to generate the HO alarm immediately in order to prevent loss of an utterance packet. If the user is a hearer, it is preferred to generate the HO alarm after end of reproduction of utterance packets already received. In addition, if the user is a speaker when handover is completed, it is preferred to stop the HO alarm immediately for prompt resumption of utterance. If the user is a hearer, it is preferred to stop the HO alarm after waiting for a predetermined amount of packets to be accumulated in the jitter buffer 47 (after waiting for a time when the VoIP application can be reproduced). Therefore, as described below, the HO alarm scheduled period Thobep is set in different manners depending on whether the user is a speaker or a hearer.

(a) The HO Alarm Scheduled Period if the User of the CN 12 is a Speaker

FIG. 11 is a diagram illustrating a sequence of handover if the user of the CN 12 is a speaker and the user of the MN 11 is a hearer. If the user of the CN 12 is the speaker, the CN 12 generates the HO alarm immediately at handover in order to prevent loss of the utterance packet. As shown in FIG. 11, an HO alarm scheduled period Thobep (CN) of the CN 12 is a period from when Thossc until which the CN 12 can transmit the last packet to the MN 11 via the first wireless NW 15 has passed to the time Thoesc when the CN 12 can transmit the first packet to the MN 11 via the second wireless NW 16. Therefore, the reproduction speed calculation unit 86 may obtain the HO alarm scheduled period Thobep (CN) by the following formula.

[Formula 12]

$$Thobep(CN)=Thoesc-Thossc \quad (12)$$

(b) The HO Alarm Scheduled Period if the User of the CN 12 is a Hearer

FIG. 10 is a diagram illustrating a sequence of handover if the user of the CN 12 is a hearer and the user of the MN 11 is a speaker. If the user of the CN 12 is the hearer at handover, the slow reproduction of the jitter buffer is performed in the CN 12 from a time as long as the time Tsttslowplay up to start of slow reproduction calculated by the reproduction speed calculation unit 86 before the time Thosrc until which the CN 12 can receive the last packet from the MN 11 via the first wireless NW 15. Then, the reproduction speed calculation unit 86 continues to obtain the number of voice packets from the jitter buffer monitoring unit 50 at predetermined intervals. In order to determine whether a packet is a voice packet or a silent packet, it is possible to use codec which has a function to determine voice/silent and, when the packet is a silent packet, transmit a packet different from the one transmitted when the packet is a voice packet. When there is no voice packet, the reproduction speed calculation unit 86 instructs the HO alarm generation unit 58 to start the HO alarm. A time to stop the HO alarm is not simply the time Thoesc when the CN 12 can transmit the first packet to the MN 11 via the second wireless NW 16, unlike that for when the user is the speaker, because the CN 12 needs to wait for arrival of packets to be reproduced from the MN 11 (that is, after Thoerc) and also because the real-time application such as VoIP starts reproduction of voice after a predetermined amount of packets are accumulated in the jitter buffer in order to deal with deviations in packet arriving intervals. As shown in FIG. 10, if Tsttslowplay represents the time up to start of slow reproduction, Tslowplay represents the slow reproduction time and Tbffacc represents a time necessary for the predetermined amount of packets to be accumulated, the reproduction speed calculation unit 86 may obtain the HO alarm scheduled period Thobep (CN) by the following formula.

$$Thobep(CN)=(Thoerc+Tbffacc)-(Thosrc-Tsttslowplay+Tslowplay) \quad \text{[Formula 13]}$$

(The Ho Alarm Stop Notification by the Reproduction Speed Calculation Unit 86)

If the user of the CN 12 is the speaker, the reproduction speed calculation unit 86 instructs the HO alarm generation unit 58 to stop the HO alarm after the HO alarm scheduled period obtained by using Formula 12 has passed. If the user of the CN 12 is the hearer, when receiving a notification that the BA notification message is received from the HA 23, the reproduction speed calculation unit 86 starts obtaining the amount of the packets accumulated in the jitter buffer 47 from the jitter buffer monitoring unit 50 at predetermined intervals. Then, the reproduction speed calculation unit 86, after waiting for the amount of accumulated packets in the jitter buffer 47 to exceeds the standard amount, instructs the HO alarm generation unit 58 to stop the HO alarm and then instructs the jitter buffer control unit 51 to start normal reproduction.

FIG. 12 is a diagram when both of the MN 11 and the CN 12 are speakers. In this case, both of the MN 11 and the CN 12 are hearers as well. However, in order to prioritize to prevent packet loss as the speaker, the CN 12 immediately starts the HO alarm at handover. That is, the HO alarm scheduled period Thobep (CN) of the CN 12 becomes the same as that in the above Formula 12.

Figure 15:
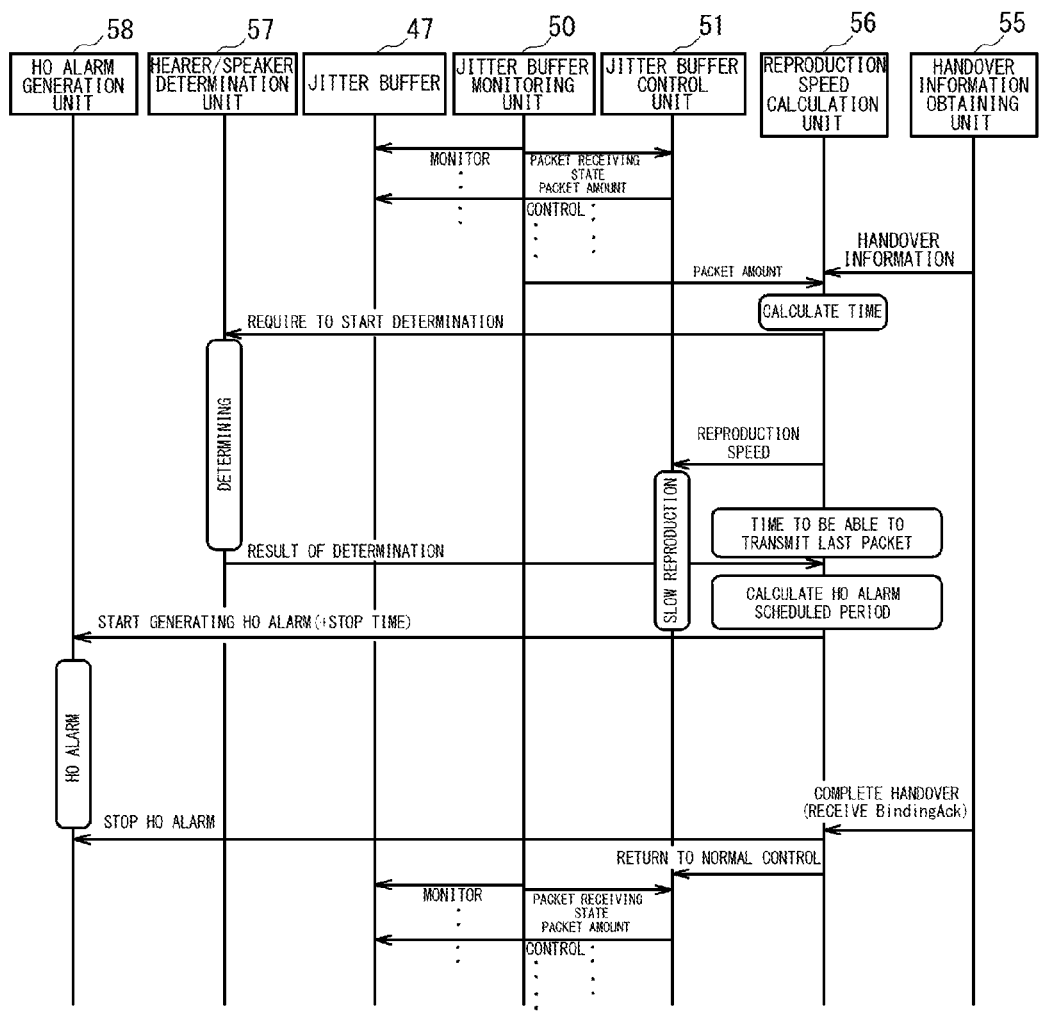
FIG. 15 is a diagram illustrating a sequence of operations of a main block shown in FIG. 5 when the user is a speaker.

FIG. 15 is a sequence diagram illustrating an operation of a main section of the telephone function unit 33 of the MN 11 when the user of the MN 11 is a speaker.

As shown in FIG. 15, the jitter buffer monitoring unit 50 monitors a reception state of packets of the jitter buffer 47 and the number of packets (data amount) in the jitter buffer 47. Based on results of monitoring, the jitter buffer control unit 51 controls a read-out speed of packets from the jitter buffer 47 and processing to discard received packets.

The handover information obtaining unit 55 monitors the handover information from the handover control unit 36 at predetermined intervals. If obtaining information that handover is scheduled, the handover control unit 55 provides required handover information (including the HO start and completion times and the NW delay times) to the reproduction speed calculation unit 56.

When receiving a notification on the amount of the accumulated packets from the jitter buffer control unit 51, the reproduction speed calculation unit 56 determines whether to perform the slow reproduction on the jitter buffer 47. In the embodiment shown in FIG. 15, it is assumed that the jitter buffer 47 has data which should be reproduced at a low speed, and the reproduction speed calculation unit 56 instructs the jitter buffer control unit 51 to perform slow reproduction. It is to be noted that, if the jitter buffer 47 has no data to be reproduced at a low speed, the sequence for performing the slow reproduction on the jitter buffer 47 may be omitted.

The reproduction speed calculation unit 56 calculates times in relation to handover shown in FIG. 7, based on the required handover information obtained from the handover information obtaining unit 55. In addition, the reproduction speed calculation unit 56 instructs the hearer/speaker determination unit 57 to determine whether the user of the MN 11 is a hearer or a speaker by the time Thossm until which the MN 11 can transmit the last packet to the HA 23 via the first wireless NW 15.

When receiving such instruction from the reproduction speed calculation unit 56, the hearer/speaker determination unit 57 determines whether the user of the MN 11 is a hearer or a speaker. This determination can be performed by monitoring voice input to the microphone in a predetermined period, for example. The hearer/speaker determination unit 57 provides a result of determination to the reproduction speed calculation unit 56.

In addition, in order to shorten the silent period, before the result arrives from the hearer/speaker determination unit 57, the reproduction speed calculation unit 56 calculates the time to perform slow reproduction on the jitter buffer. At a point as long as the time obtained by calculation before the time to start handover, the reproduction speed calculation unit 56 instructs the jitter buffer control unit 51 to perform slow reproduction.

When receiving the result of determination by the hearer/speaker determination unit 57, the reproduction speed calculation unit 56 calculates an HO alarm start time and an HO alarm stop time and notifies the HO alarm generation unit 58 of the HO alarm scheduled period.

When receiving the notification from the reproduction speed calculation unit 56, the HO alarm generation unit 58 controls the speaker 49 to generate the HO alarm.

When receiving Binding Ack indicating completion of handover from the HA 23, the handover information obtaining unit 55 notifies the reproduction speed calculation unit 56 accordingly. The reproduction speed calculation unit 56 notifies the HO alarm generation unit 58 to stop the HO alarm. In addition, the reproduction speed calculation unit 56 notifies the jitter buffer 51 so as to instruct the jitter buffer control unit 51 to perform normal reproduction on the jitter buffer 47.

Figure 16:
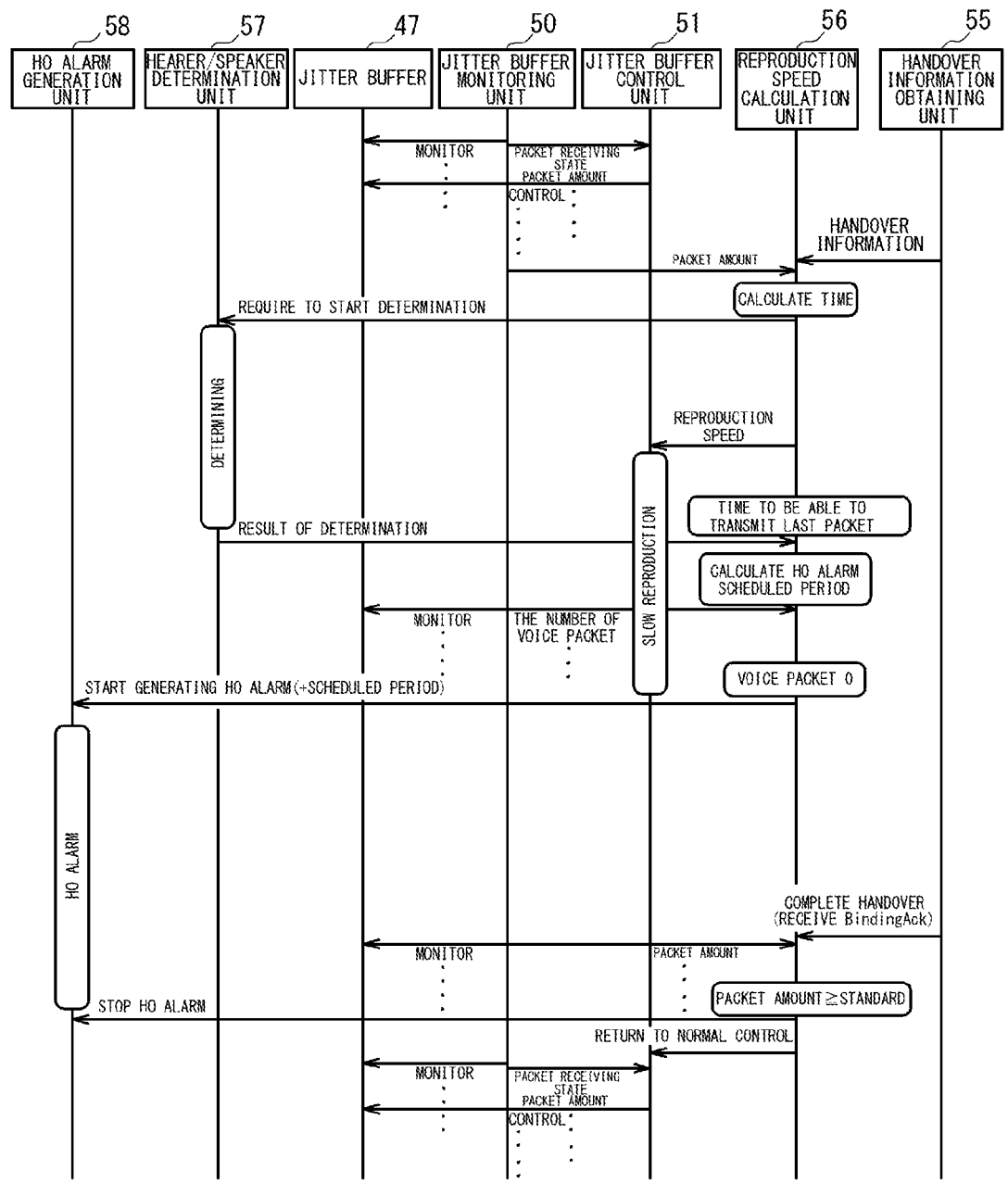
FIG. 16 is a diagram illustrating a sequence of operations of the main block shown in FIG. 5 when the user is a hearer.

FIG. 16 is a sequence diagram illustrating an operation of a main section of the telephone function unit 33 of the MN 11 when the user of the MN 11 is a hearer. Since the result of determination by the hearer/speaker determination unit 57 is different from that in the sequence when the user is the speaker as shown in FIG. 15, the HO alarm scheduled period also differs as stated above. That is, when the user of the MN 11 is a hearer, the HO alarm starts after slow reproduction of the jitter buffer 47 at start of handover, and ends at a point when the predetermined amount of packets are accumulated in the jitter buffer 47 at completion of handover. Thus, when receiving Binding Act indicative of completion of handover from the HA 23, the reproduction speed calculation unit 56 shown in FIG. 16 waits until the number of received packets reaches the number of packets which should be accumulated in the jitter buffer 47 and then instructs the HO alarm generation unit 58 to stop the HO alarm.

Figure 17:
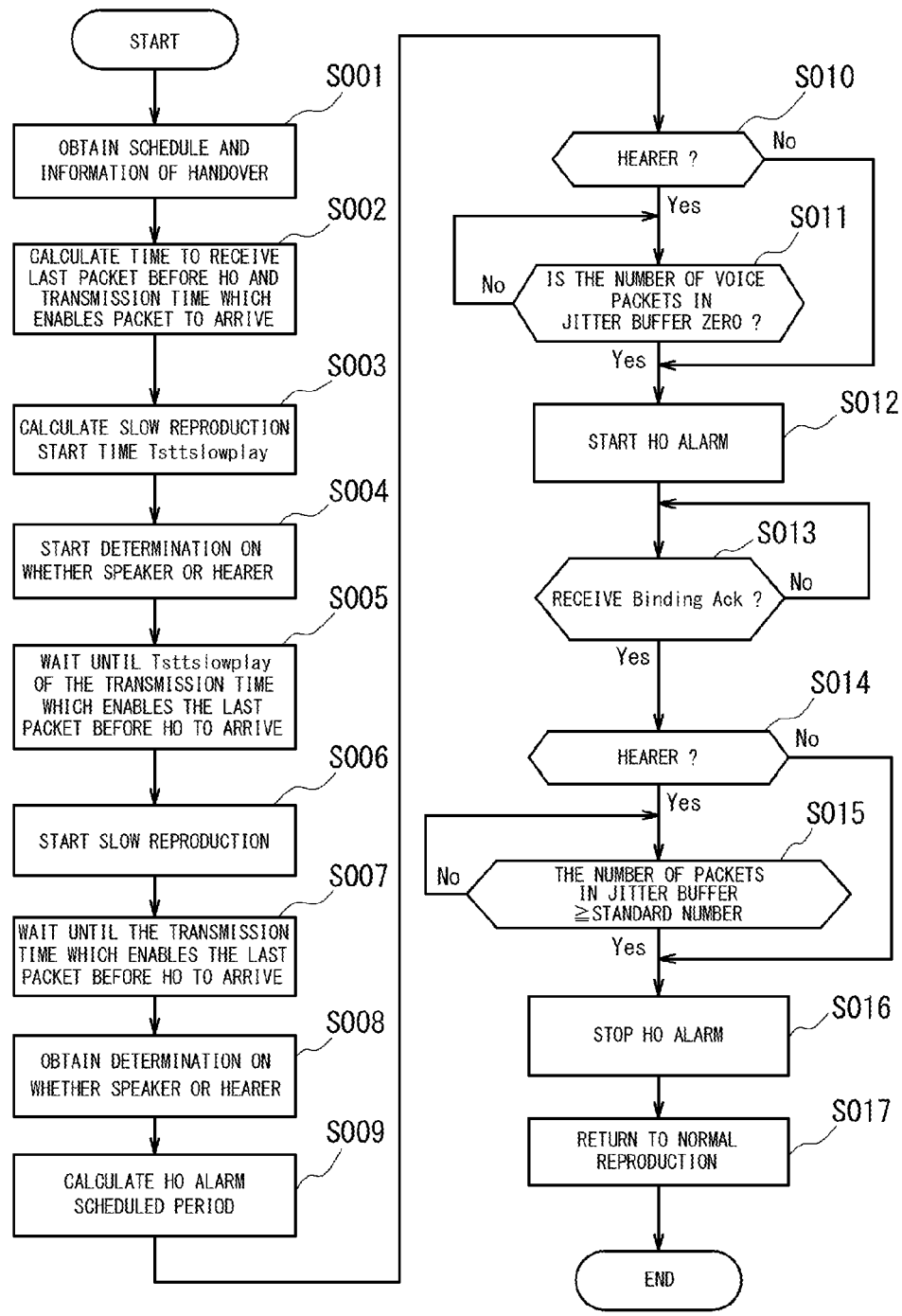
FIG. 17 is a diagram illustrating a flow of operations of the wireless communication apparatus according to the present invention.

FIG. 17 is a flowchart illustrating an operation of the MN 11. Since detail of each step is already described, only brief description will be given here. The handover information obtaining unit 55 monitors the handover information from the handover control unit 36 at predetermined intervals. If receiving the information that handover is scheduled, the handover information obtaining unit 55 provides the required handover information (including the HO start and completion times and the NW delay times) to the reproduction speed calculation unit 56 (S001).

The reproduction speed calculation unit 56 calculates the times in relation to handover shown in FIG. 7, based on the required handover information obtained from the handover information obtaining unit 55 (S002). In addition, the reproduction speed calculation unit 56 calculates the slow reproduction time to shorten the silent period by slow reproduction of the VoIP application (S003).

The reproduction speed calculation unit 56 instructs the hearer/speaker determination unit 57 to determine whether the user is a hearer or a speaker. When receiving such instruction from the reproduction speed calculation unit 56, the hearer/speaker determination unit 57 determines whether the user of the MN 11 is a hearer or a speaker (S004).

The reproduction speed calculation unit 56 waits to a point as long as the time obtained by the above calculation before the time to start handover (S005) and then instructs the jitter buffer control unit 51 to perform slow reproduction, thereby slow reproduction of the jitter buffer 47 is started (S006).

The reproduction speed calculation unit 56 waits until the time to start handover (S007) and obtains the result of determination from the hearer/speaker determination unit 57 (S008). Based on the result of determination, the reproduction speed calculation unit 56 calculates the HO alarm scheduled period (S009).

The reproduction speed calculation unit 56 determines whether the user is a hearer or a speaker according to the result of determination (S010) and, if the user is the hearer, performs slow reproduction of voice packets until there is no voice packet in the jitter buffer 47. When there is no voice packet, the reproduction speed calculation unit 56 instructs the HO alarm generation unit 58 to generate the HO alarm (S011).

If the user of the MN 11 is a speaker, the reproduction speed calculation unit 56 instructs the HO alarm generation unit 58 to generate the HO alarm immediately (S012).

During generation of the HO alarm, the handover control unit 36 monitors whether the communication processing unit 34 receives Binding Ack (S013). If confirming reception of Binding Ack, the handover control unit 36 notifies the handover information obtaining unit 55 accordingly. The handover information obtaining unit 55 notifies the reproduction speed calculation unit 56 of such reception of Binding Ack.

Based on the result of determination by the hearer/speaker determination unit 57, the reproduction speed calculation unit 56 determines whether the user of the MN 11 is a hearer (S014). If the user is a hearer, the reproduction speed calculation unit 56 monitors the packets in the jitter buffer 47 until packets more than the standard amount of the packets necessary for reproduction of the VoIP application are accumulated in the jitter buffer 47 (S015) and, when the number of packets in the jitter buffer 47 reaches the standard number, instructs the HO alarm generation unit 58 to stop the HO alarm (S016). If the user of the MN 11 is a speaker, the reproduction speed calculation unit 56 instructs the HO alarm generation unit 58 to stop the HO alarm immediately (S016).

The reproduction speed calculation unit 56 instructs the jitter buffer control unit 51 to cancel slow reproduction of the jitter buffer 47 (S017).

Figure 18:
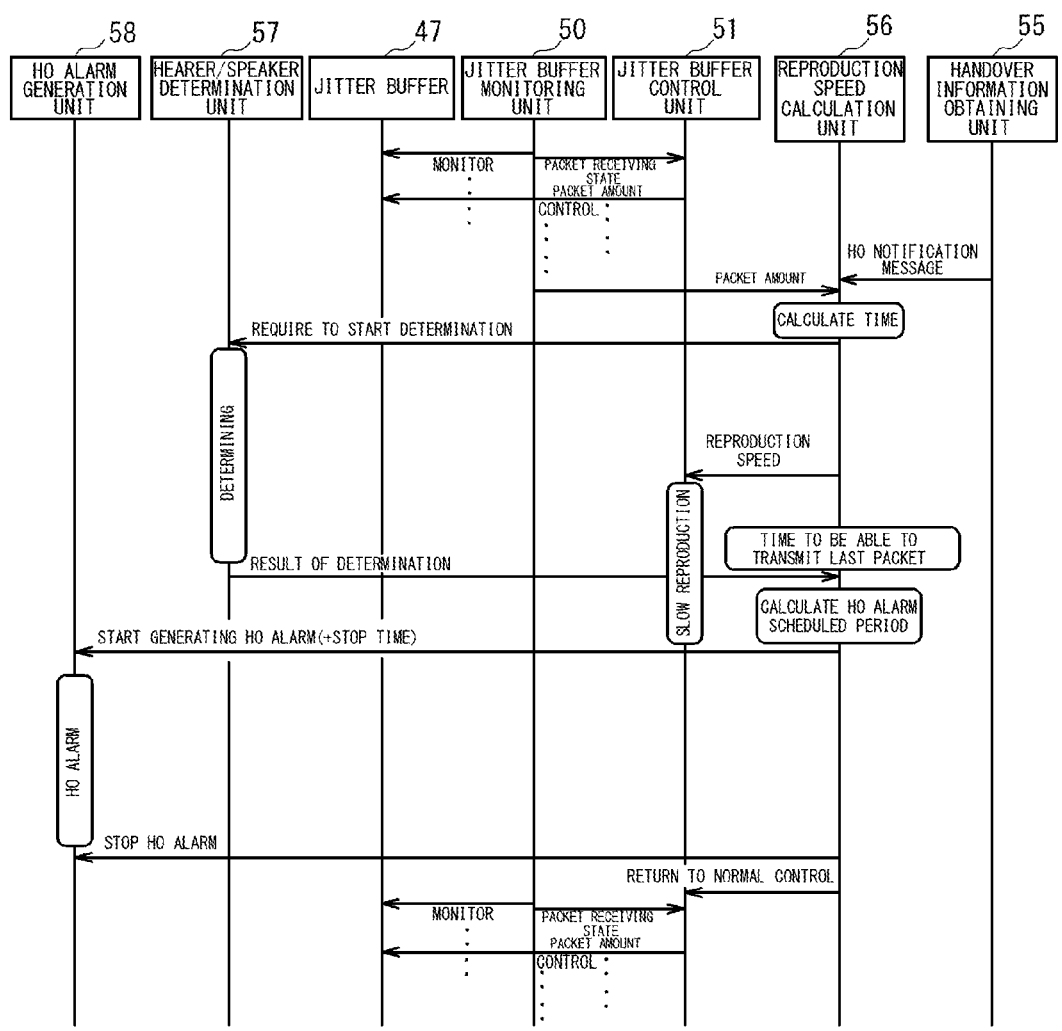
FIG. 18 is a diagram illustrating a sequence of operations of a main block shown in FIG. 6 when the user is a speaker.

FIG. 18 is a sequence diagram illustrating an operation of a main section of the telephone function unit 83 of the CN 12 when the user of the CN 12 is a speaker.

As shown in FIG. 18, the jitter buffer monitoring unit 50 monitors a reception state of packets by the jitter buffer 47 and the number of packets (data amount) in the jitter buffer 47. Based on results of monitoring, the jitter buffer control unit 51 controls a read-out speed of packets from the jitter buffer 47 and processing to discard received packets.

If obtaining the HO notification message from the MN 11, the handover information obtaining unit 85 provides the reproduction speed calculation unit 86 with the required handover information (including the HO start and completion times and the NW delay times).

When receiving a notification of the amount of the accumulated packets from the jitter buffer control unit 51, the reproduction speed calculation unit 86 determines whether to perform slow reproduction of the jitter buffer 47. In the embodiment shown in FIG. 18, it is assumed that the jitter buffer 47 has data which should be reproduced at a low speed, and the reproduction speed calculation unit 86 instructs the jitter buffer control unit 51 to perform slow reproduction. It is to be noted that, if the jitter buffer 47 has no data to be reproduced at a low speed, a sequence of processing to perform slow reproduction on the jitter buffer 47 may be omitted.

The reproduction speed calculation unit 86 calculates the times in relation to handover shown in FIG. 7, based on the required handover information obtained from the handover information obtaining unit 55. In addition, the reproduction speed calculation unit 86 instructs the hearer/speaker determination unit 57 to determine whether the user of the CN 12 is a hearer or a speaker by the time Thossc until which the CN 12 can transmit the last packet to the MN 11 via the first wireless NW 15.

When receiving such instruction from the reproduction speed calculation unit 86, the hearer/speaker determination unit 57 determines whether the user of the CN 12 is a hearer or a speaker. This determination can be performed by monitoring voice input to the microphone in a predetermined period, for example. The hearer/speaker determination unit 57 provides a result of determination to the reproduction speed calculation unit 86.

In addition, in order to shorten the silent period, before the result arrives from the hearer/speaker determination unit 57, the reproduction speed calculation unit 86 calculates the time to perform slow reproduction on the jitter buffer. At a point as long as the time obtained by calculation before the time Thosrc when the CN 12 can receive the last packet from the MN 11 via the first wireless NW 15 (arrival time of a packet transmitted by the MN 11 to the CN 12 at the time Thossm), the reproduction speed calculation unit 86 instructs the jitter buffer control unit 51 to perform slow reproduction.

When receiving the result of determination by the hearer/speaker determination unit 57, the reproduction speed calculation unit 86 calculates the HO alarm start time and the HO alarm stop time and notifies the HO alarm generation unit 58 of the HO alarm scheduled period.

When receiving the notification from the reproduction speed calculation unit 86, the HO alarm generation unit 58 controls the speaker 49 to generate the HO alarm.

Since the user of the CN 12 is a speaker in FIG. 18, the reproduction speed calculation unit 86 instructs the HO alarm generation unit 58 to stop the HO alarm after the HO alarm scheduled period obtained from Formula 12 has passed. In addition, the reproduction speed calculation unit 86 notifies the jitter buffer control unit 51 and instructs to perform normal reproduction of the jitter buffer 47.

Figure 19:
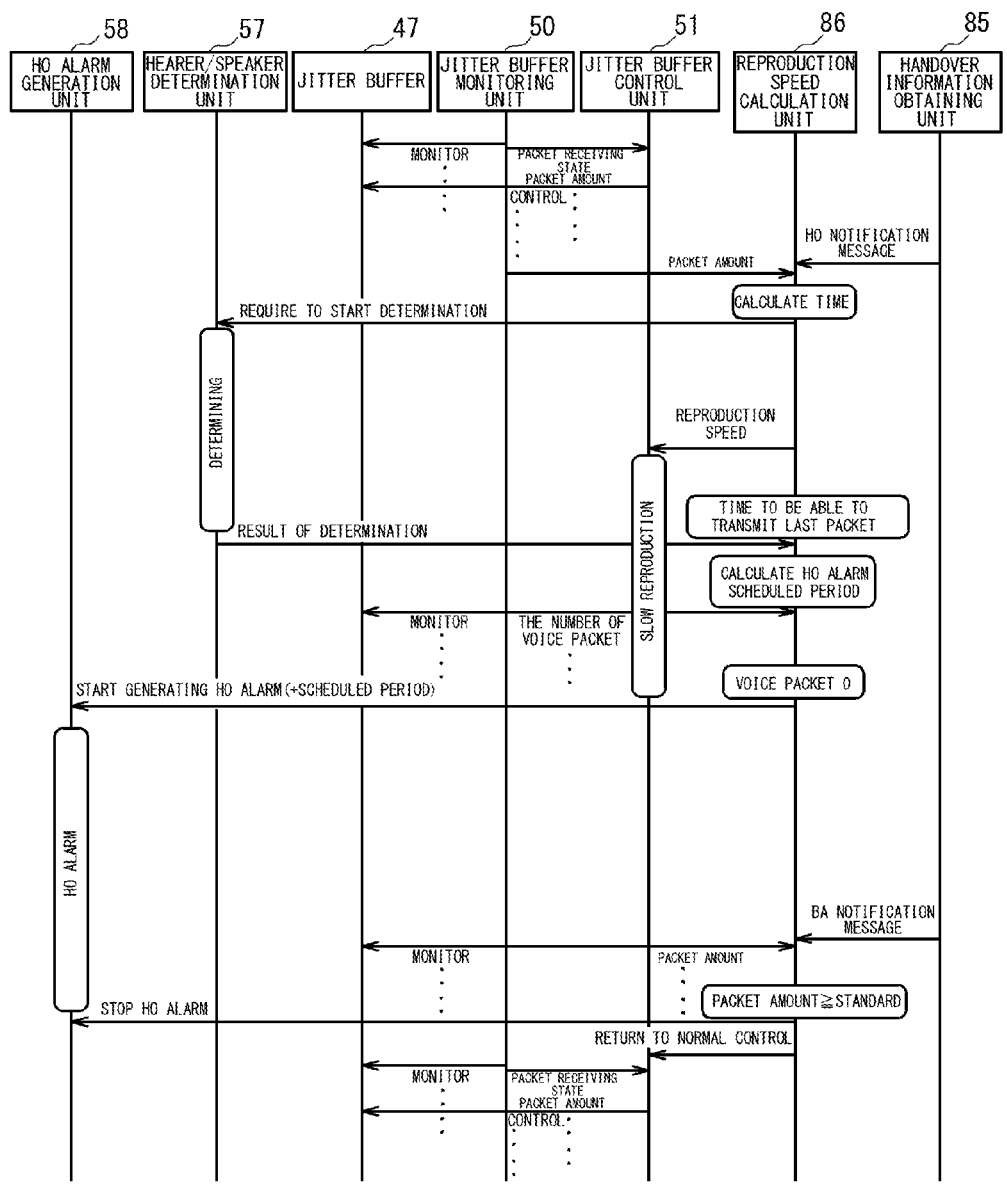
FIG. 19 is a diagram illustrating a sequence of operations of the main block shown in FIG. 6 when the user is a hearer.

FIG. 19 is a sequence diagram illustrating an operation of a main section of the telephone function unit 83 of the CN 12 when the user of the CN 12 is a hearer. Since the result of determination by the hearer/speaker determination unit 57 is different from that in the sequence when the user is a speaker as shown in FIG. 18, the HO alarm scheduled period also differs as stated above. That is, when the user of the MN 11 is a hearer, generation of the HO alarm is started after slow reproduction of the jitter buffer 47 at start of handover and stopped when the predetermined amount of packets are accumulated in the jitter buffer 47 at completion of handover. Thus, when receiving the BA notification message from the MN 11, the reproduction speed calculation unit 86 shown in FIG. 19 waits until the number of received packets reaches the number of packets which should be accumulated in the jitter buffer 47 and then instructs the HO alarm generation unit 58 to stop the HO alarm.

Figure 20:
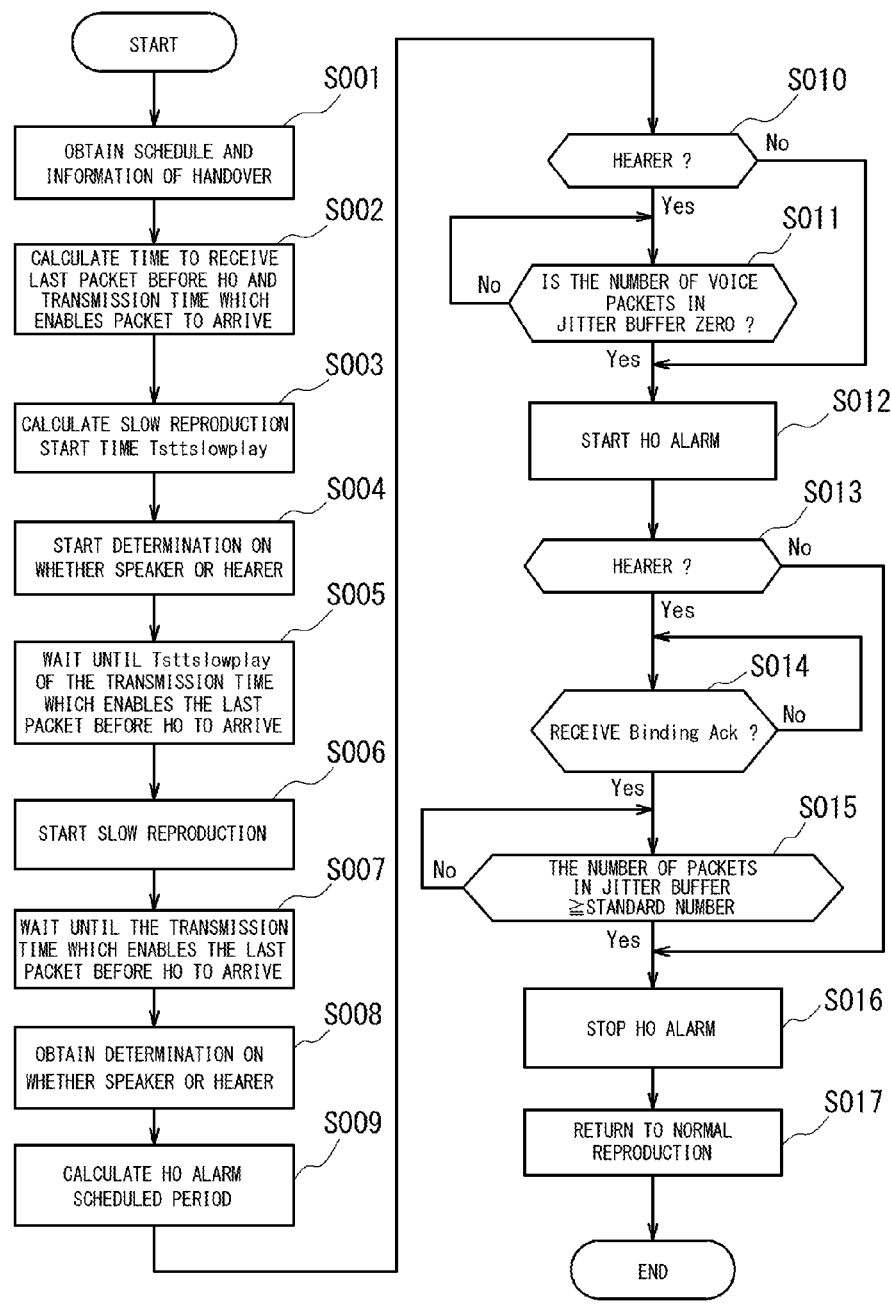
FIG. 20 is a diagram illustrating a flow of operations of the communication apparatus according to the present invention.

FIG. 20 is a flowchart illustrating an operation of the CN 12. Since detail of each step is already described, only brief description will be given here. If receiving the HO notification message from the MN 11, the handover information obtaining unit 85 provides the reproduction speed calculation unit 86 with the required handover information (including the HO start and completion times and the NW delay times) (S001).

The reproduction speed calculation unit 86 calculates the times in relation to handover shown in FIG. 7, based on the required handover information obtained from the handover information obtaining unit 85 (S002). In addition, the reproduction speed calculation unit 86 calculates the slow reproduction time to shorten the silent period by slow reproduction of the VoIP application (S003).

The reproduction speed calculation unit 86 instructs the hearer/speaker determination unit 57 to determined whether the user is a hearer or a speaker. When receiving such instruction from the reproduction speed calculation unit 86, the hearer/speaker determination unit 57 determines whether the user of the CN 12 is a hearer or a speaker (S004).

The reproduction speed calculation unit 86 waits to a point as long as the time obtained by the above calculation before the time when the CN 12 can transmit the last packet to the MN 11 via the first wireless NW 15 (S005) and then instructs the jitter buffer control unit 51 to perform slow reproduction of the jitter buffer 47 (S006).

The reproduction speed calculation unit 86 waits until the CN 12 can transmit the last packet to the MN 11 via the first wireless NW 15 (S007) and obtains the result of determination from the hearer/speaker determination unit 57 (S008). Based on the result of determination, the reproduction speed calculation unit 86 calculates the HO alarm scheduled period (S009).

The reproduction speed calculation unit 86 determines whether the user is a hearer according to the result of determination (S010) and, if the user is the hearer, performs slow reproduction of voice packets until there is no voice packet in the jitter buffer 47. When there is no voice packet, the reproduction speed calculation unit 86 instructs the HO alarm generation unit 58 to generate the HO alarm (S011).

If the user of the CN 12 is a speaker, the reproduction speed calculation unit 86 instructs the HO alarm generation unit 58 to generate the HO alarm immediately (S012).

Based on the result of determination by the hearer/speaker determination unit 57, the reproduction speed calculation unit 86 determines whether the user of the CN 12 is a hearer (S013). If the user of the CN 12 is a speaker, the reproduction speed calculation unit 86 instructs the HO alarm generation unit 58 to stop the HO alarm after the HO alarm scheduled period has passed (S016).

If the user of the CN 12 is a hearer, when receiving the BA notification message from the MN 11 during generation of the HA alarm, the handover information obtaining unit 85 informs the reproduction speed calculation unit 86 accordingly (S014).

The reproduction speed calculation unit 86 monitors packets in the jitter buffer 47 until the number of packets necessary for reproduction of the VoIP application reaches the standard number of packets (S015). When the number of packets in the jitter buffer 47 reaches the standard number, the reproduction speed calculation unit 86 instructs the HO alarm generation unit 58 to stop the HO alarm (S016).

The reproduction speed calculation unit 86 instructs the jitter buffer control unit 51 to cancel slow reproduction of the jitter buffer 47 (S017).

Figure 21:
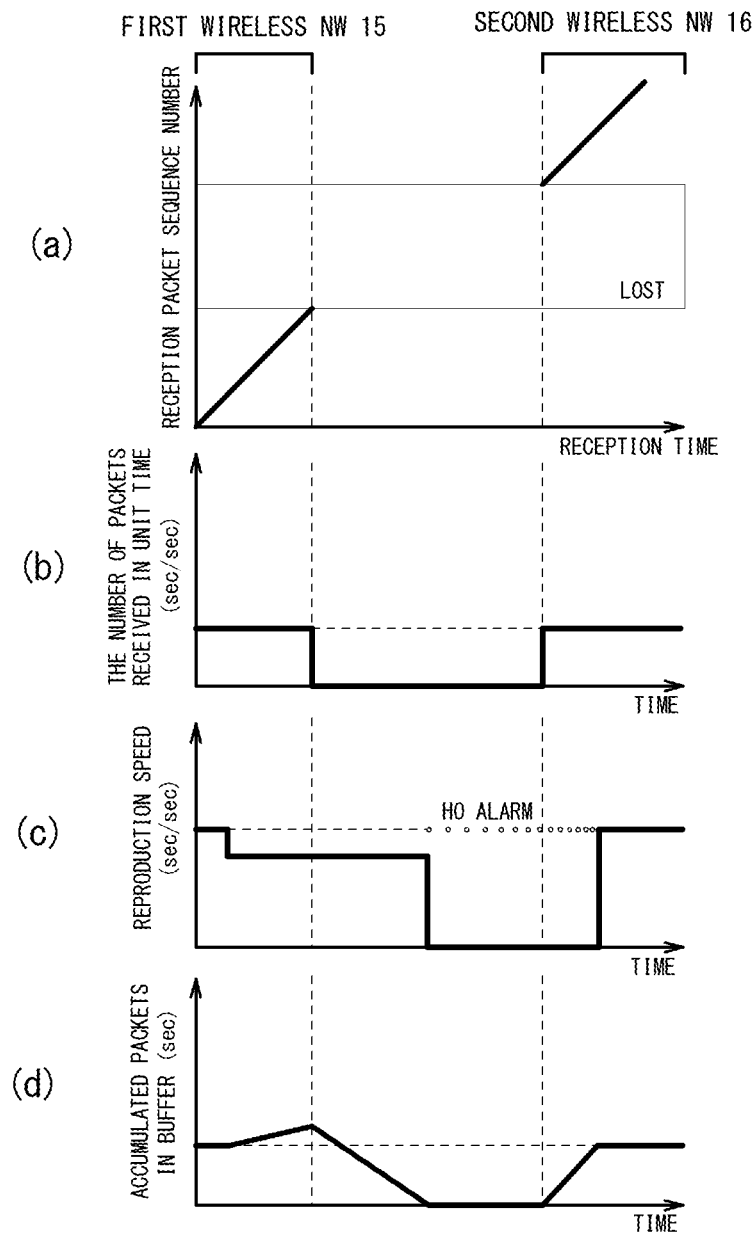
FIG. 21 is a diagram illustrating change in received packets according to the present invention.
Figure 22:
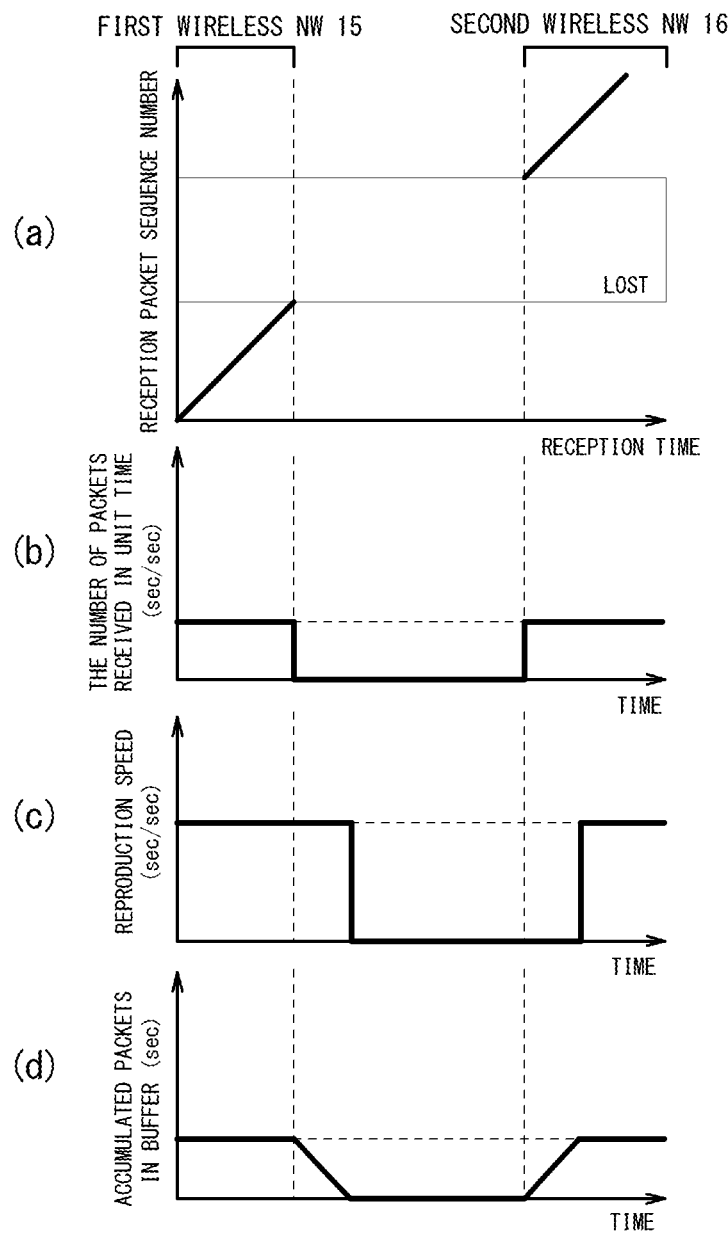
FIG. 22 is a diagram illustrating change in received packets according to a conventional method.

FIG. 21 is a diagram illustrating change in received packets in the wireless communication apparatus (MN 11) and the communication apparatus (CN 12) according to the present embodiment. In addition, FIG. 22 is a diagram illustrating change in received packets by a conventional method which does not perform either slow reproduction of the jitter buffer or generation of the HO alarm, for comparison with FIG. 21. In FIG. 21 and FIG. 22, (a) shows sequence numbers of received packets in the wireless communication apparatus and the communication apparatus, (b) shows the number of packets received in a unit time, (c) shows a reproduction speed (sec/sec) of the real-time application and (d) shows the number of packets accumulated in the buffer.

As obvious from FIG. 22, according to the conventional method of reproduction, since a reproduction speed is fixed even if packet loss is caused and the number of packets received in the unit time becomes zero, it causes unilateral reduction in the packets accumulated in the jitter buffer and thus generates a silent period.

As shown in FIG. 21, the wireless communication terminal according to the present invention, before packet loss occurs and the number of packets received in the unit time becomes zero, receives a notification of handover schedule from the handover control unit 36 and the reproduction speed calculation unit 56 switches reproduction speed of the jitter buffer 47 to a low speed. Thereby, slow reproduction is performed before packet loss is caused and, as a result, the packets accumulated in the jitter buffer 47 temporarily increases before packet loss. In addition, since such increased packets are reproduced at a low speed, it is possible to delay generation of the silent period. Moreover, when the silent period is generated, the HO alarm generation unit 58 generates the HO alarm indicating that handover is in progress, thus the wireless communication terminal resolves user's sense of anxiety. Since the cycle of intervals of the HO alarm is accelerated as it is closer to completion of handover, it can reduce the user's sense of anxiety caused by continuous silence by enabling the user to recognize completion of handover intuitively.

In addition, as shown in FIG. 21, the communication terminal according to the present invention receives the HO notification message from the MN 11 before packet loss occurs and the number of packets received in the unit time becomes zero and the reproduction speed calculation unit 86 switches reproduction speed of the jitter buffer 47 to a low speed. Thereby, slow reproduction is performed before packet loss is caused and, as a result, the packets accumulated in the jitter buffer 47 temporarily increases before packet loss. In addition, since such increased packets are reproduced at a low speed, it is possible to delay generation of silent period. Moreover, when the silent period is generated, the HO alarm generation unit 58 generates the HO alarm indicating that handover is in progress, thus the communication terminal resolves user's sense of anxiety. Since the cycle of intervals of the HO alarm is accelerated as it is closer to completion of handover, it can reduce the user's sense of anxiety caused by continuous silence by enabling the user to recognize completion of handover intuitively.

As set forth above, the wireless communication terminal and the communication terminal according to the present embodiment, when the silent period is generated in the real-time application such as VoIP due to packet loss at handover, activate the HO alarm (for example, beep sound), indicating that the terminal is performing handover, during the silent period. Thereby, the wireless communication terminal and the communication terminal notify the user that the silent period is caused by handover, and thus prevents the user's misunderstanding that communication is disconnected completely. In addition, since the wireless communication terminal and the communication terminal slow down the reproduction speed of the real-time application before handover is started, it shortens the silent period caused by handover. Moreover, the wireless communication terminal and the communication terminal control a period to generate the HO alarm depending on whether the user is a speaker or a hearer, and thereby prevent unnecessary packet loss especially on a speaker's side and enable smooth resumption of conversation. Furthermore, since the wireless communication terminal and the communication terminal change method to generate the HO alarm depending on a time before completion of handover, the user can determine the time before completion of handover and it prevents user's sense of anxiety and misunderstanding.

It is to be understood that the present invention is not limited to the above embodiment but may be modified or varied in a multiple of manners. For example, the present invention is applicable not only when executing the VoIP application but also when executing an application for the real-time communication such as for streaming and reproducing multimedia data such as images and music. In such a case, the execution unit of the application may include a multimedia function unit having a similar function to control the jitter buffer instead of the telephone function unit.

In addition, although it is assumed that the wireless communication network is CDMA2000 1x EV-DO and the wireless LAN in the above embodiment, a scope of the present invention is not limited to such wireless communication network but applicable to any wireless communication network currently used or expected to be actually used in the future such as, for example, PDC (Personal Digital Cellular), W-CDMA (Wideband CDMA), WiMAX (IEEE 802.16), iBurst (registered trademark), LTE (Long Term Evolution), UMB (Ultra Mobile Broadband) and the like.

REFERENCE SIGNS LIST 11 wireless communication apparatus
12 communication apparatus
12a handset
15 first wireless communication network
15a base station
16 second wireless communication network
16a access point
18 internet
21, 22, 24 SIP server
23 Home Agent (HA)
31 first wireless I/F
32 second wireless OF
33 telephone function unit
34 communication processing unit
35 radio information obtaining unit
36 handover control unit
44 encoder
47 jitter buffer
50 jitter buffer monitoring unit
51 jitter buffer control unit
55 handover information obtaining unit
56 reproduction speed calculation unit
57 hearer/speaker determination unit
58 HO alarm generation unit
61 measuring server
62 first information server
63 second information server
81 network OF
82 communication processing unit
83 telephone function unit
85 handover information obtaining unit
86 reproduction speed calculation unit

The invention claimed is:
1. A wireless communication apparatus comprising:
a wireless communication unit configured to perform wireless communication by connecting to a first wireless communication network and a second wireless communication network different from the first wireless communication network;

an execution unit configured to execute an application for real-time communication via the wireless communication unit;
a communication quality obtaining unit configured to obtain communication quality of a wireless link of the first wireless communication network during execution of the application by connecting to the first wireless communication network;
a determination unit configured to determine whether to start preparing handover from the first wireless communication network to the second wireless communication network based on the communication quality obtained by the communication quality obtaining unit;
an estimation unit, when the determination unit determines to start preparing handover during execution of the application, configured to estimate a handover start time based on the communication quality obtained by the communication quality obtaining unit;
a control unit configured to control so as to generate a sound indicating that the handover is in progress, during processing of the handover; and
a determination unit configured to determine whether a user of the wireless communication apparatus is a speaker or a hearer in the application, wherein the control unit is configured to control a time to generate the sound indicating that the handover is in progress, based on a result of determination by the determination unit, and wherein the control unit, based on the result of determination by the determination unit:
is configured to generate the sound indicating that the handover is in progress immediately after start of handover if the user is a speaker, and
is configured to generate the sound indicating that the handover is in progress when there is no reproduction data of the application after start of handover if the user is a hearer.

2. The wireless communication apparatus according to claim 1, wherein the control unit is configured to control the execution unit to slow down a reproduction speed of the application from a predetermined time before the handover start time estimated by the estimation unit.

3. The wireless communication apparatus according to claim 1, wherein:
the estimation unit is configured to estimate a handover completion time, and
the control unit is configured to control a notification interval to generate the sound indicating that the handover is in progress, based on the handover completion time estimated by the estimation unit.

4. The wireless communication apparatus according to claim 3, wherein the control unit is configured to control the notification interval to generate a sound indicating that the handover is in progress so as to become shorter as it is closer to the handover completion time.

5. The wireless communication apparatus according to claim 1, wherein:
the estimation unit is configured to estimates a handover completion time, and
the control unit is configured to control a notification interval to generate the sound indicating that the handover is in progress, based on the handover completion time estimated by the estimation unit.

6. The wireless communication apparatus according to claim 5, wherein the control unit is configured to control the notification interval to generate the sound indicating that the handover is in progress so as to become shorter as it is closer to the handover completion time.

7. A communication apparatus comprising:
a communication unit configured to execute communication by connecting to a communication network;
an execution unit configured to execute an application for real-time communication via the communication unit;
a control unit configured to control so as to receive handover information, from a wireless communication apparatus, that the wireless communication apparatus, which is a communication counterpart of the application, performs handover from a first wireless communication network being communicated to a second wireless communication network different from the first wireless communication network and to generate a control unit configured to control so as to generate a sound indicating that the handover is in progress, during processing of the handover; and
a determination unit configured to determine whether a user of the communication apparatus is a speaker or a hearer in the application, wherein the control unit is configured to control a time to generate the sound indicating that the handover is in progress, based on a result of determination by the determination unit, and wherein the control unit, based on the result of determination by the determination unit:
is configured to generate the sound indicating that the handover is in progress immediately after start of handover if the user is a speaker, and
is configured to generate the sound indicating that the handover is in progress when there is no reproduction data of the application after start of handover if the user is a hearer.

8. The communication apparatus according to claim 7, wherein the control unit, based on the handover information, is configured to control the execution unit to slow down a reproduction speed of the application from a predetermined time before a time when packets from the first wireless communication network cannot be received.

9. The wireless communication apparatus according to claim 7, wherein the control unit, based on the result of determination by the determination unit:
is configured to generate the sound indicating that the handover is in progress immediately after start of handover if the user is a speaker, and
is configured to generate the sound indicating that the handover is in progress when there is no reproduction data of the application after start of handover if the user is a hearer.

10. The wireless communication apparatus according to claim 7, wherein the control unit comprises an estimation unit, and wherein:
the estimation unit is configured to estimate a handover completion time, and
the control unit is configured to control a notification interval to generate the sound indicating that the handover is in progress, based on the handover completion time estimated by the estimation unit.

11. The wireless communication apparatus according to claim 10, wherein the control unit is configured to control the notification interval to generate the sound indicating that the handover is in progress so as to become shorter as it is closer to the handover completion time.

* * * * *